(12) United States Patent
Shirata et al.

(10) Patent No.: US 6,992,729 B2
(45) Date of Patent: Jan. 31, 2006

(54) VIDEO PROCESSING METHOD AND DEVICE

(75) Inventors: Yoshinari Shirata, Chiba (JP); Yoshiki Koura, Tokyo (JP)

(73) Assignee: Sony Corporation, Tokyo (JP)

( * ) Notice: Subject to any disclaimer, the term of this patent is extended or adjusted under 35 U.S.C. 154(b) by 521 days.

(21) Appl. No.: 09/803,838

(22) Filed: Mar. 12, 2001

(65) Prior Publication Data

US 2002/0008784 A1   Jan. 24, 2002

(30) Foreign Application Priority Data

Mar. 14, 2000   (JP) .............................. 2000-070673

(51) Int. Cl.
  *H04N 1/46* (2006.01)
  *G03F 3/08* (2006.01)
(52) U.S. Cl. ...................................... 348/673; 358/521
(58) Field of Classification Search ................ 348/673, 348/687, 649, 674, 675, 676, 677; 358/518, 358/520, 521; 382/167

See application file for complete search history.

(56) References Cited

U.S. PATENT DOCUMENTS

| | | | | |
|---|---|---|---|---|
| 4,812,903 A | * | 3/1989 | Wagensooner et al. ..... | 358/521 |
| 4,831,434 A | * | 5/1989 | Fuchsberger ................ | 358/521 |
| 5,130,786 A | * | 7/1992 | Murata et al. .......... | 375/240.25 |
| 5,239,540 A | * | 8/1993 | Rovira et al. ............... | 370/345 |
| 5,317,427 A | * | 5/1994 | Ichikawa ..................... | 358/520 |
| 5,384,601 A | * | 1/1995 | Yamashita et al. .......... | 348/577 |
| 5,546,134 A | * | 8/1996 | Lee ............................. | 348/673 |
| 5,615,312 A | * | 3/1997 | Kohler ....................... | 358/1.9 |
| 5,870,154 A | * | 2/1999 | Conover et al. ............ | 348/673 |
| 5,936,602 A | * | 8/1999 | Tsuchida et al. .............. | 345/99 |
| 6,137,540 A | * | 10/2000 | Desprez-Le Goarnat et al. .......................... | 348/631 |
| 6,714,723 B2 | * | 3/2004 | Abecassis .................... | 386/83 |

* cited by examiner

*Primary Examiner*—Paulos M. Natnael
(74) *Attorney, Agent, or Firm*—Frommer Lawrence & Haug LLP; William S. Frommer; Thomas F. Presson

(57) ABSTRACT

A video processing method comprises the steps of dividing an entire input data region into three of first, second and third regions in order from the low level side thereof; setting, as an output data characteristic to input data, a trapezoidal characteristic which is nonlinear and continuous as a whole and consists of a linear portion in the first region where the gain is greater than one, a linear portion in the second region where the gain is equal to one exactly or approximately, and a linear portion in the third region where the gain is smaller than one; setting, as another output data characteristic to the input data, an S-shaped characteristic which is nonlinear and continuous as a whole and consists of linear portions in the first and third regions where the gain is smaller than one, and a linear portion in the second region where the gain is greater than one; selecting either the trapezoidal characteristic or the S-shaped characteristic; and correcting the digital luminance data in accordance with the selected characteristic. This method eliminates the known disadvantages and increases the luminance of a reproduced image while raising the contrast of its dark portion.

14 Claims, 20 Drawing Sheets tr-or-s = 0 : TRAPEZOIDAL COMPONENT
tr-or-s = 1 : S-SHAPED COMPONENT

<u>21, 22, 33, 38</u>  CALCULATOR × (1+Kg)

<u>24, 31, 32, 35</u>  CALCULATOR × (1−Ka)

F I G. 16
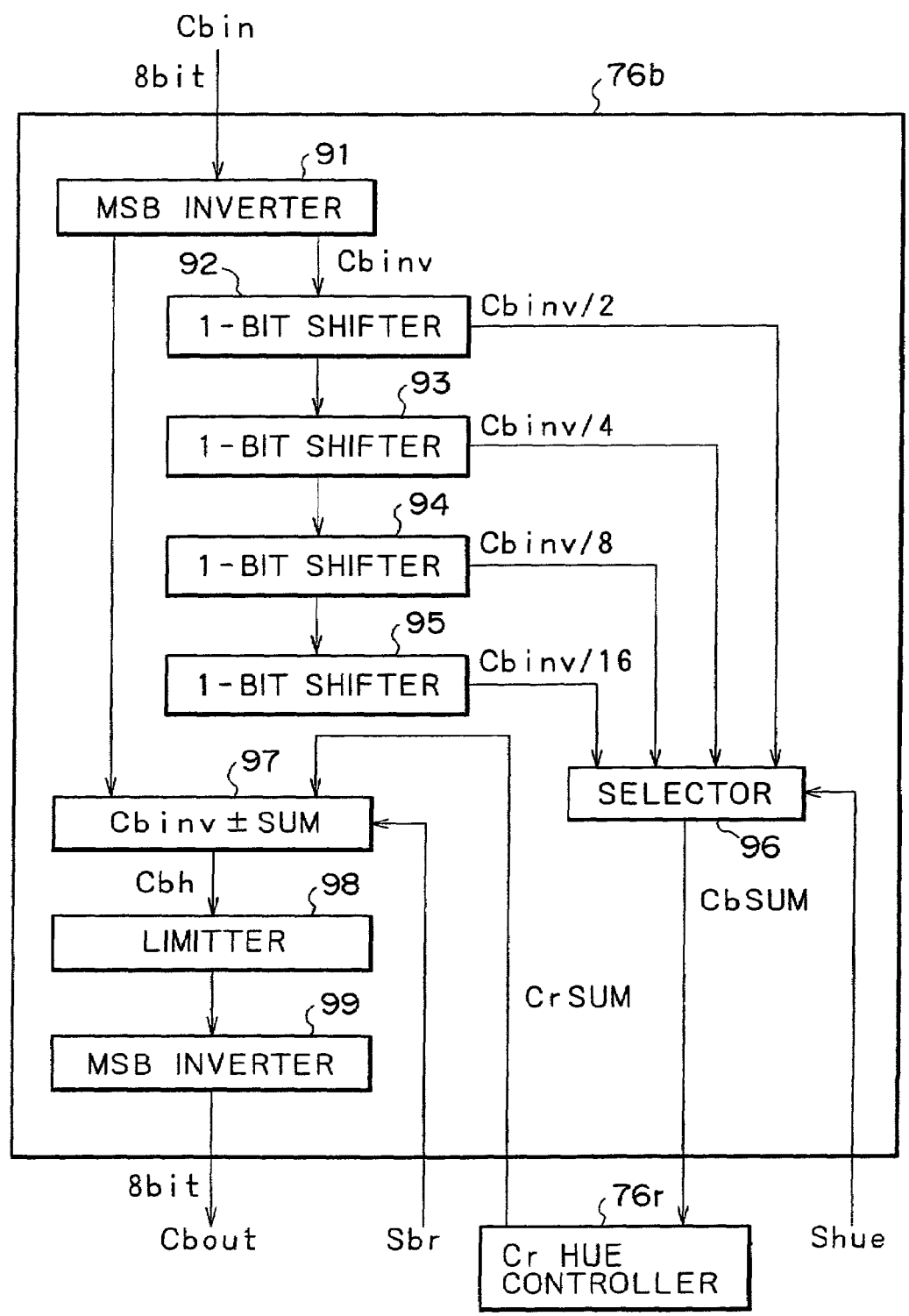

VIDEO PROCESSING METHOD AND DEVICE

BACKGROUND OF THE INVENTION

The present invention relates to a video processing method and device adapted for use in a DVD (Digital Video Disc, Digital Versatile Disc) player, a digital TV (Television) receiver or the like.

When increasing an image luminance in a TV receiver for example in accordance with video contents, a DC level of a luminance signal is raised.

However, when the DC level of the luminance signal is raised for increasing the luminance, a black level portion is rendered whitish, and also a nearly white level portion is saturated to cause a white blur condition. And the contrast of an intermediate tone region may be enhanced unnaturally in some cases.

For the purpose of solving the above problem, an improvement may be so contrived as to correct the luminance signal with a nonlinear characteristic. However, due to the employment of a curved correction characteristic, there exist some disadvantages including that the processing is complicated and the signal is deteriorated.

SUMMARY OF THE INVENTION

It is therefore an object of the present invention to provide improvements where, in correction of a luminance signal for increasing the luminance of an image or raising the contrast of a dark portion, a satisfactory result is attainable without causing such disadvantages that a black level portion is rendered whitish or a saturated white blur is induced in a nearly white level portion to bring about unnatural contrast in an intermediate tone region, hence increasing the image luminance while raising the contrast of the dark portion.

According to one aspect of the present invention, there is provided a video processing method which comprises the steps of dividing an entire input data region into three of first, second and third regions in order from the low level side thereof; setting, as an output data characteristic to input data, a trapezoidal characteristic which is nonlinear and continuous as a whole and consists of a linear portion in the first region where the gain is greater than one, a linear portion in the second region where the gain is equal to one exactly or approximately, and a linear portion in the third region where the gain is smaller than one; setting, as another output data characteristic to the input data, an S-shaped characteristic which is nonlinear and continuous as a whole and consists of linear portions in the first and third regions where the gain is smaller than one, and a linear portion in the second region where the gain is greater than one; selecting either the trapezoidal characteristic or the S-shaped characteristic; and correcting the digital luminance data in accordance with the selected characteristic.

In the method mentioned above, the correction characteristic is trapezoidal or S-shaped without raising the DC level of the luminance signal, so that there occurs none of the known disadvantages that the black level portion is rendered whitish or the nearly white level portion is blurred.

In the trapezoidal characteristic, the gain is greater than one merely in the linear portion of the first region, while the gain is equal to one exactly or approximately in the linear portion of the second region, whereby the contrast of the dark portion can be increased without causing any unnatural increase of the contrast in the intermediate tone region.

Further, since the correction characteristic is attained by combining the three linear portions and the luminance data are digitally processed, the processing is simplified with another advantage of eliminating any deterioration of the signal.

The above and other features and advantages of the present invention will become apparent from the following description which will be given with reference to the illustrative accompanying drawings.

BRIEF DESCRIPTION OF THE DRAWINGS

FIG. 16 shows a partial example of a hue controller;

DETAILED DESCRIPTION OF THE PREFERRED EMBODIMENTS

Hereinafter some preferred embodiments of the present invention will be described in detail with reference to the accompanying drawings.

In the luminance correction method of the present invention, 8-bit input digital luminance data for example are corrected to 8-bit output digital luminance data.

Figure 1:
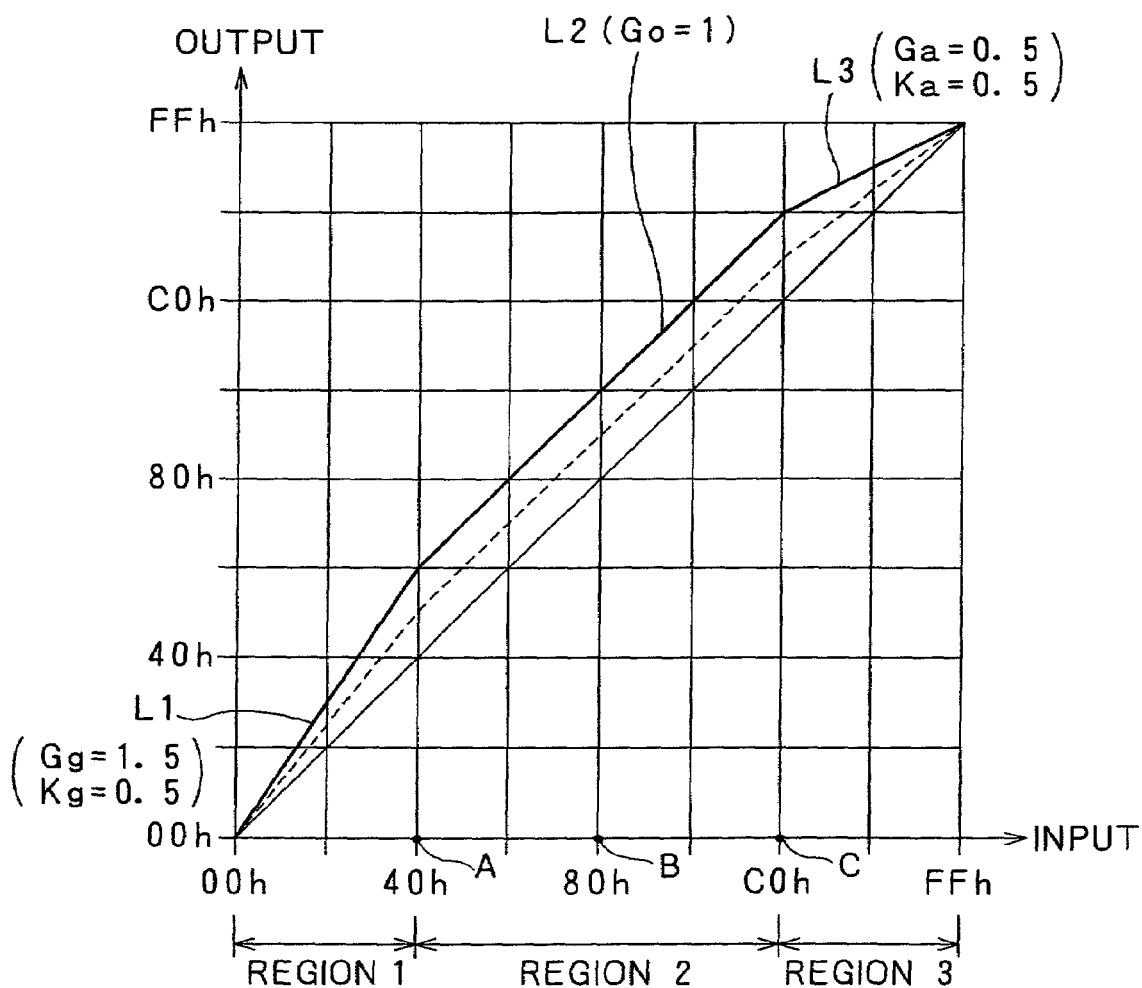
FIG. 1 graphically shows an example of a trapezoidal characteristic.

FIG. 1 shows an example of its correction characteristic.

In this trapezoidal characteristic, it is defined that an intermediate value B is exactly in the middle between the minimum and maximum values of the input data; a boundary value A is between the minimum value and the intermediate value B; a boundary value C is between the intermediate value B and the maximum value; a region 1 ranges from the minimum value to the boundary value A; a region 2 ranges from the boundary value A to the boundary value C; and a region 3 ranges from the boundary value C to the maximum value.

In the example of FIG. 1, the boundary value A is exactly in the middle between the minimum value and the intermediate value B, and the boundary value C is exactly in the middle between the intermediate value B and the maximum value, wherein the width of the region 1 and that of the region 3 are equal to each other, and the sum thereof is equal to the width of the region 2. However, this case represents merely an example, and such conditions are not requisite at all.

In the region 1, there is formed a linear portion L1 where a gain Gg is greater than one as Gg=1+Kg (in which 0<Kg<1). In the region 2, there is formed a linear portion L2 where a gain Go is equal to one. And in the region 3, there is formed a linear portion L3 where a gain Ga is smaller than 1 as Ga=1−Ka (in which 0<Ka<1). Thus, the gain Gg is an amplification factor, and the gain Ga is an attenuation factor.

The relationship between the amplification factor Gg and the attenuation factor Ga is such that, when the respective widths of the regions 1 and 3 are equal to each other, Gg+Ga=2, and Kg=Ka. The characteristic denoted by a solid line in FIG. 1 represents a case where Kg=Ka=0.5, Gg=1.5, and Ga=0.5. Meanwhile the characteristic denoted by a broken line represents a case where Kg=Ka=0.25, Gg=1.25, and Ga=0.75.

As a result, in this correction characteristic, the respective full scale values of the input data and output data are equalized to each other, so that any region loss is eliminated therein, and the linear portions L1, L2 and L3 are rendered continuous.

And in the luminance correction method of the present invention, luminance data are corrected in conformity with such trapezoidal characteristic. Therefore, according to the present invention that differs from the conventional case of raising the DC level of the luminance signal, the image luminance can be increased without causing the known disadvantages that any black level portion is rendered whitish or any nearly white level portion is blurred.

Since the gain Go in the region 2 is one and the gain Gg in the region 1 alone is greater than one, it becomes possible to increase the contrast of any dark portion without unnaturally increasing the contrast of any intermediate tone region.

Thus, the trapezoidal characteristic is achieved by combining the three linear portions, and the luminance data are corrected digitally, so that the processing for correction is simplified without inducing deterioration of the signal.

Further, it becomes possible to change the boundary values A, C and the gains Gg, Ga with facility by such digital processing, hence attaining easy setting of optimal correction characteristic in consideration of various factors that include the characteristic of a digital video source such as DVD, STB (Set Top Box), DV (Digital Video: standards of home digital VTR), the characteristic of an image display device such as CRT display, liquid crystal display, video projector, head mount display or the like, and the human visual characteristic.

Besides the above, further optimal image characteristic can be realized by performing, in combination with such luminance data correction, gain control (chroma control) and hue control with regard to color data such as color difference data.

Since the boundary values A, C and the gains Gg, Ga can be changed with facility, an image of optimal characteristic can be obtained in real time by detecting, for example, the level distribution of luminance data in real time and then executing real-time setting of optimal correction characteristic in accordance with the detected level distribution.

In a digital video reproducing apparatus such as a DVD player for example, after a recording medium is reproduced and the correction characteristic thereof is controlled by a user, its control parameter may be stored in the reproducing apparatus correspondingly to medium identification information that specifies the relevant recording medium. Then, when the same recording medium is reproduced subsequently, it becomes possible, in the reproducing apparatus, to set the proper correction characteristic optimal to the relevant recording medium without the necessity of the user's operation.

In the case of displaying an image on a video projector for example, there occurs a black floating state where a nearly black level portion is rendered whitish. And if the DC level of the luminance signal is lowered for eliminating such a state, black confusion is caused with nearly black level portions turned entirely to a black level.

Figure 2:
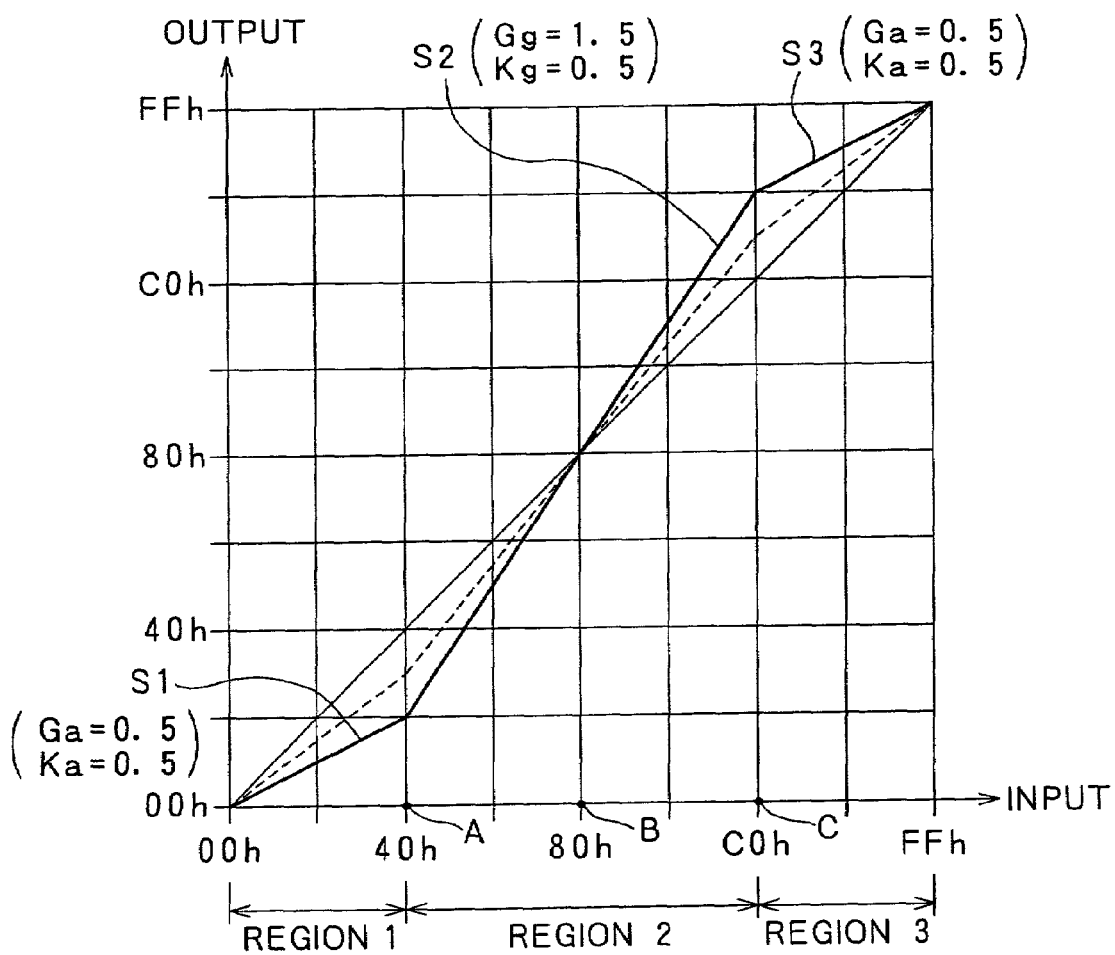
FIG. 2 graphically shows an example of an S-shaped characteristic.

In view of the above problem, another luminance correction method of the present invention is so contrived as to set the following correction characteristic in addition to the trapezoidal characteristic mentioned. FIG. 2 shows an example of such correction characteristic.

In this S-shaped characteristic, similarly to the aforementioned trapezoidal characteristic, the whole input data region is divided into three regions 1, 2 and 3 in this order from the low level side. In the example of FIG. 2, a boundary value A is exactly in the middle between the minimum value and an intermediate value B, and a boundary value C is exactly in the middle between the intermediate value B and the maximum value, wherein the width of the region 1 and that of the region 3 are equal to each other, and the sum thereof is equal to the width of the region 2. However, this case represents merely an example, and such conditions are not requisite at all.

In the regions 1 and 3, there are formed linear portions S1 and S3 respectively where a gain Ga is smaller than one as Ga=1−Ka (in which 0<Ka<1). And in the region 2, there is formed a linear portion S2 where a gain Gg is greater than one as Gg=1+Kg (in which 0<Kg<1). Thus, the gain Gg is an amplification factor, and the gain Ga is an attenuation factor.

The relationship between the amplification factor Gg and the attenuation factor Ga is such that, when the sum of the respective widths of the regions 1 and 3 is equal to the width of the region 2, Gg+Ga=2, and Kg=Ka. The characteristic denoted by a solid line in FIG. 2 represents a case where Kg=Ka=0.5, Gg=1.5, and Ga=0.5. Meanwhile the characteristic denoted by a broken line represents a case where Kg=Ka=0.25, Gg=1.25, and Ga=0.75.

As a result, in this correction characteristic, the respective full scale values of the input data and output data are equalized to each other, so that any region loss is eliminated therein, and the linear portions S1, S2 and S3 are rendered continuous.

And in this luminance correction method of the present invention, either the trapezoidal characteristic of FIG. 1 or the S-shaped characteristic of FIG. 2 is selected, and then the luminance data are corrected in conformity with the selected characteristic.

For example, if a black floating condition occurs in displaying an image on a video projector, the signal level can be lowered in a region proximate to the black-level boundary value A by selecting the S-shaped characteristic and correcting the luminance data according thereto, so that such a black floating condition is not caused and black confusion is not induced either differently from the known case of lowering the DC level of the luminance signal.

FIGS. 3 to 8 show an exemplary configuration of a circuit for executing the luminance correction mentioned above, wherein luminance data are corrected after selection of either the trapezoidal characteristic or the S-shaped characteristic.

Figure 3:
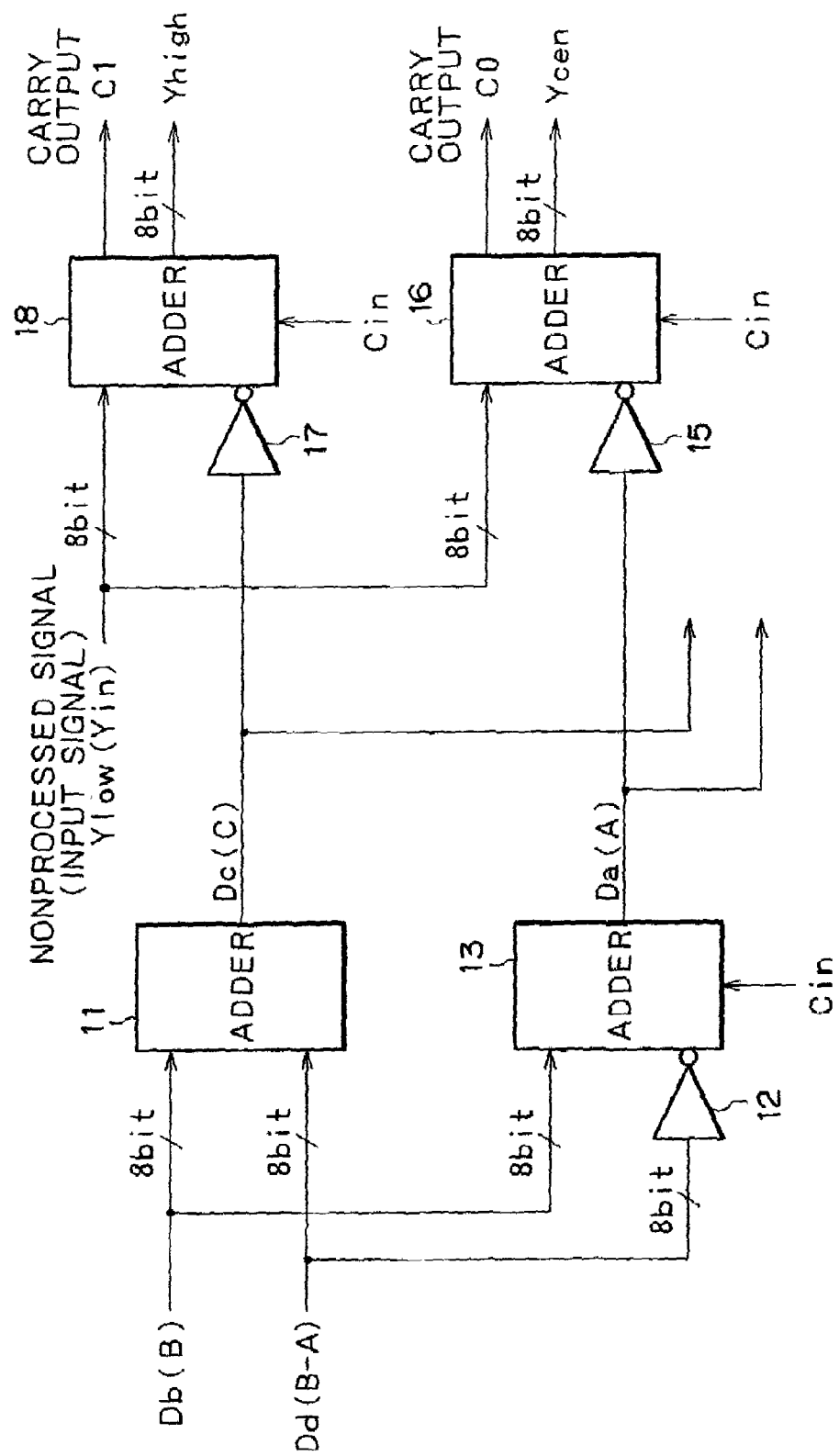
FIGS. 3 to 8 show partial examples of a luminance corrector.

In an original signal generator 10 of FIG. 3, data Db indicative of an intermediate value B and data Dd indicative of the difference between the intermediate value B and the boundary value A (difference between boundary value C and intermediate value B) are added to each other by an adder 11 to thereby produce data Dc indicative of the boundary value C. Further, data obtained by inverting each bit of the data Dd in an inverter 12 and the data Db are added to each other in an adder 13 to thereby produce data Da indicative of the boundary value A.

Subsequently input data Yin, i.e., non-processed signal Ylow of continuous values shown in FIG. 9, and data obtained by inverting, in an inverter 15, each bit of the data Da which indicate the boundary value A of the output of the adder 13, are added to each other in an adder 16 to thereby produce a signal Ycen of FIG. 9 obtained through subtraction of the boundary value A from the signal Ylow.

Figure 9:
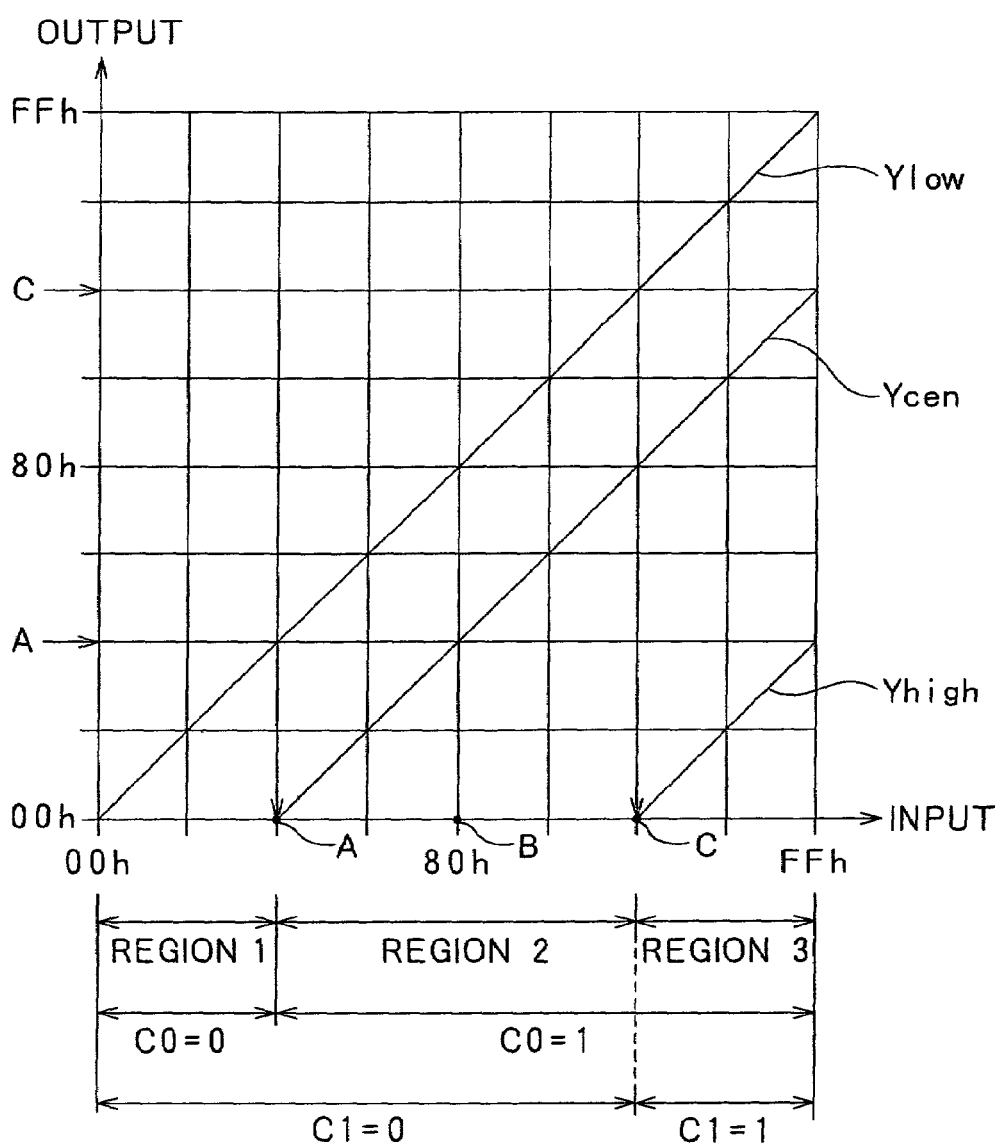
FIGS. 9 to 12 are graphic diagrams for explaining a luminance correction process.

Further, the signal Ylow and the data obtained by inverting, in an inverter 17, each bit of the data Dc indicating the boundary value C of the output of the adder 11, are added to each other in an adder 18 to thereby produce a signal Yhigh of FIG. 9 obtained through subtraction of the boundary value C from the signal Ylow.

In this case, a carry input Cin is supplied to the adders 13, 16 and 18, and then the adder 16 produces a carry output C0 which becomes 1 or 0 when the input data Yin is greater or smaller than the boundary value A respectively, while the adder 18 produces a carry output C1 which becomes 1 or 0 when the input data Yin is greater or smaller than the boundary value C respectively.

Figure 4:
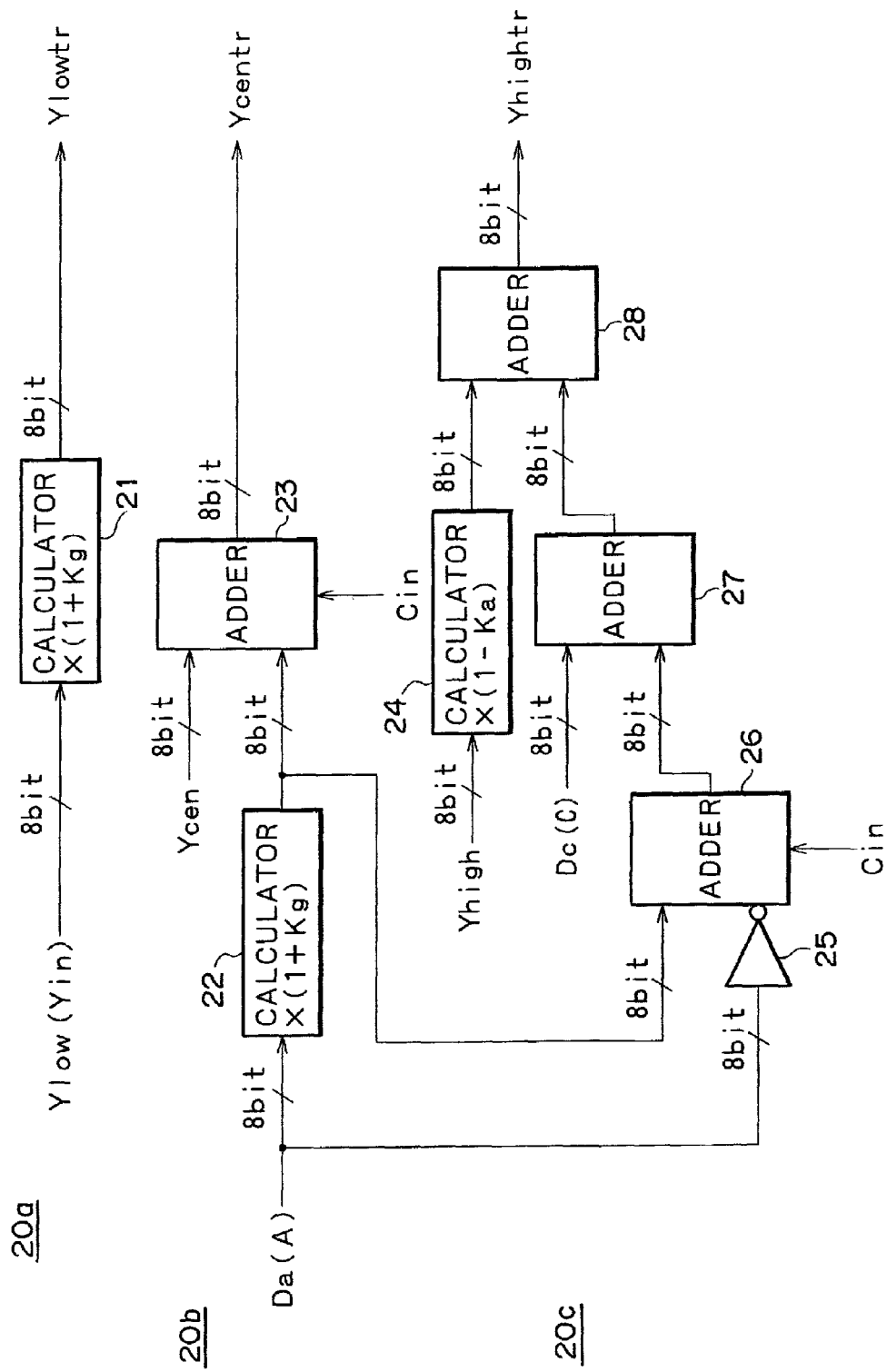

In a trapezoidal component generator 20 of FIG. 4, its circuits 20a, 20b and 20c for regions 1, 2 and 3 generate signal components which are in a state corrected as the whole in accordance with the trapezoidal characteristic and are related to the regions 1, 2 and 3 respectively.

Figure 10:
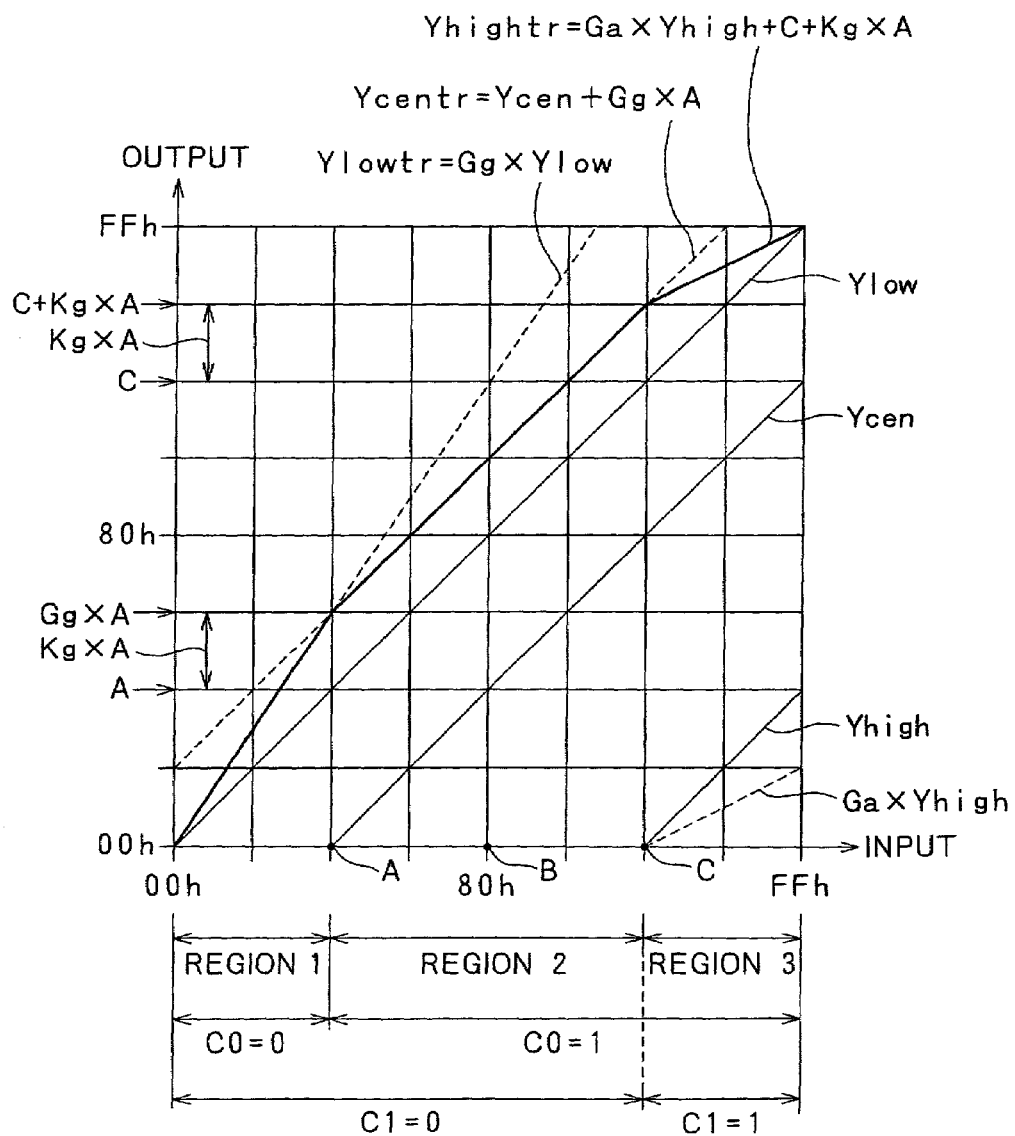

More specifically, in the circuit 20a for region 1, a calculator 21 multiplies the signal Ylow, i.e. the input data Yin, by (1+Kg) or Gg to produce a signal Ylowtr shown in FIG. 10.

In the circuit 20b for region 2, a calculator 22 multiplies the output data Da, which indicate the boundary value A, of the adder 13 in FIG. 3, by (1+Kg) or Gg, and then an adder 23 adds the output data of the calculator 22 indicative of Gg×A, and the output signal Ycen of the adder 16 in FIG. 3 to thereby produce a signal Ycentr shown in FIG. 10.

And in the circuit 20c for region 3, a calculator 24 multiplies the output signal Yhigh of the adder 18 in FIG. 3, by (1−Ka) or Gg to produce a signal Ga×Yhigh shown in FIG. 10.

Further in the circuit 20c, an adder 26 adds the output data, which indicate the output (1+Kg)A of the calculator 22, and the data obtained by inverting, in an inverter 25, each bit of the data Da indicative of the boundary value A, to each other to produce data indicative of Kg×A, then an adder 27 adds the data Kg×A and the output data Dc, which indicate the boundary value C, of the adder 11 in FIG. 3 to thereby produce data indicative of C+Kg×A, and subsequently an adder 28 adds the data C+Kg×A and the output signal Ga×Yhigh of the calculator 24 to thereby produce a signal Yhightr shown in FIG. 10.

Figure 5:
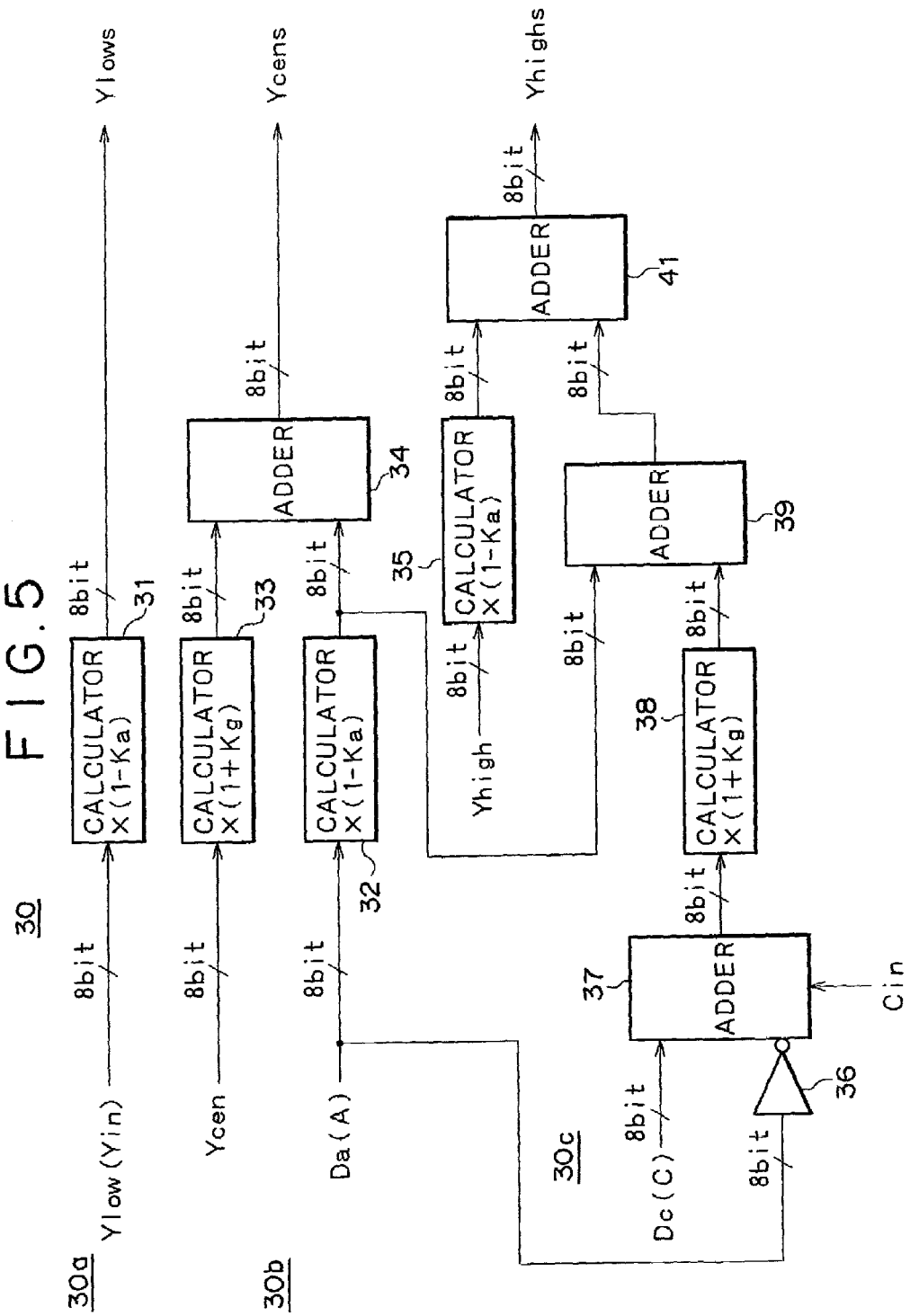

In an S-shaped component generator 30 of FIG. 5, its circuits 30a, 30b and 30c for regions 1, 2 and 3 generate signal components which are in a state corrected as the whole in accordance with the S-shaped characteristic and are related to the regions 1, 2 and 3 respectively.

Figure 11:
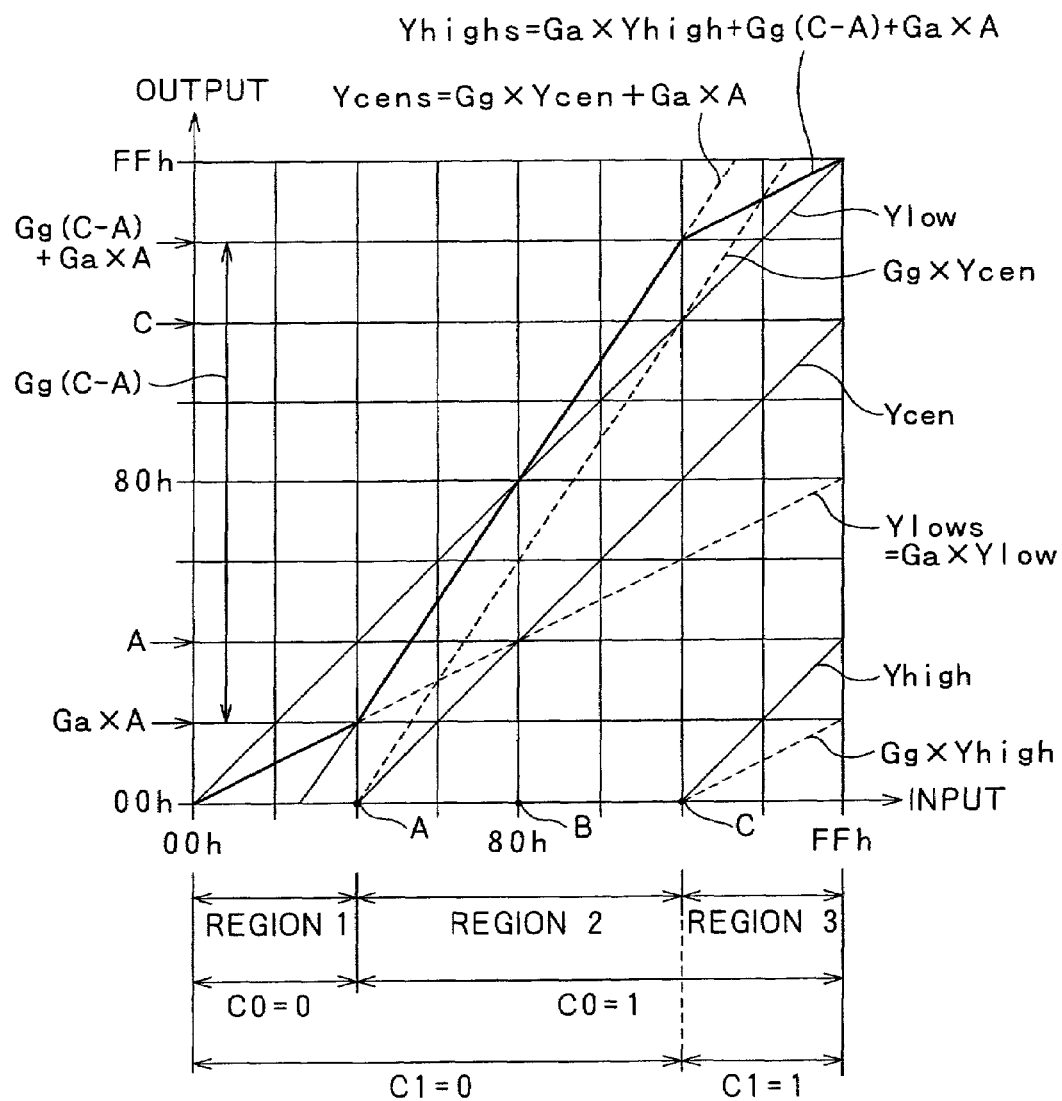

More specifically, in the circuit 30a for region 1, a calculator 31 multiplies the signal Ylow, i.e. input data Yin, by (1−Ka) or Ga to produce a signal Ylows shown in FIG. 11.

In the circuit 30b for region 2, a calculator 32 multiplies the output data Da, which indicate the boundary value A, of the adder 13 in FIG. 3, by (1−Ka) or Ga, then a calculator 33 multiplies the output signal Ycen of the adder 16 in FIG. 3, by (1+Kg) or Gg to produce a signal Gg×Ycen shown in FIG. 11, and an adder 34 adds the signal Gg×Ycen and the output data Ga×A of the calculator 32 to thereby produce a signal Ycens shown in FIG. 11.

And in the circuit 30c for region 3, a calculator 35 multiplies the output signal Yhigh of the adder 18 in FIG. 3, by (1−Ka) or Ga to produce a signal Ga×Yhigh shown in FIG. 11.

Further in the circuit 30c, an adder 37 adds the output data Dc, which indicate the boundary value C, of the adder 11 in FIG. 3, and the data obtained by inverting, in an inverter 36, each bit of the data Da indicative of the boundary value A, to each other to produce data indicative of C−A, then a calculator 38 multiplies the data C−A by (1+Kg) or Gg to produce data indicative of Gg(C−A), subsequently an adder 39 adds the data Gg(C−A) and the output data Ga×A of the calculator 32 to produce data indicative of Gg(C−A)+Ga×A, and an adder 41 adds the data Gg(C−A)+Ga×A and the output signal Ga×Yhigh of the calculator 35 to thereby produce a signal Yhighs shown in FIG. 11.

The calculator 24 in FIG. 4 and the calculator 35 in FIG. 5 may be formed in combination by a single calculator.

Figure 6:
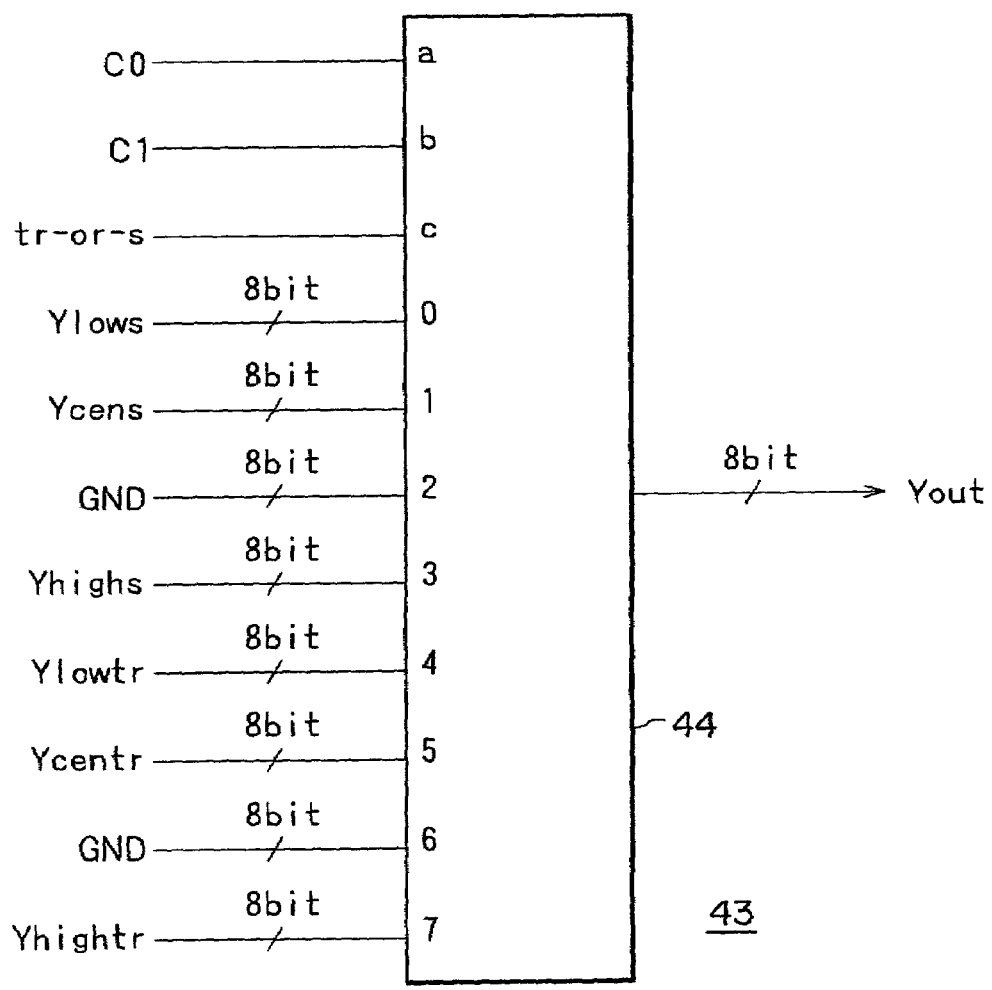

A signal selective compositor 43 shown in FIG. 6 consists of a multiplexer 44, wherein the output signals Ylows, Ycens, Yhighs of the S-shaped component generator 30 in FIG. 5 and also the output signals Ylowtr, Ycentr, Yhightr of the trapezoidal component generator 20 in FIG. 4 are supplied to input terminals of the multiplexer 44. Further, a trapezoidal/S-shaped select signal tr-or-s is supplied to a select terminal c of the multiplexer 44, and region ID carry outputs C0, C1 obtained respectively from the adders 16, 18 in FIG. 3 are supplied to select terminals a, b of the multiplexer 44.

In the case of selecting the trapezoidal characteristic, the signals Ylowtr, Ycentr, Yhightr representing the trapezoidal components are selected by setting tr-or-s=0. Meanwhile, in the case of selecting the S-shaped characteristic, the signals Ylows, Ycens, Yhighs representing the S-shaped components are selected by setting tr-or-s=1.

Figure 12:
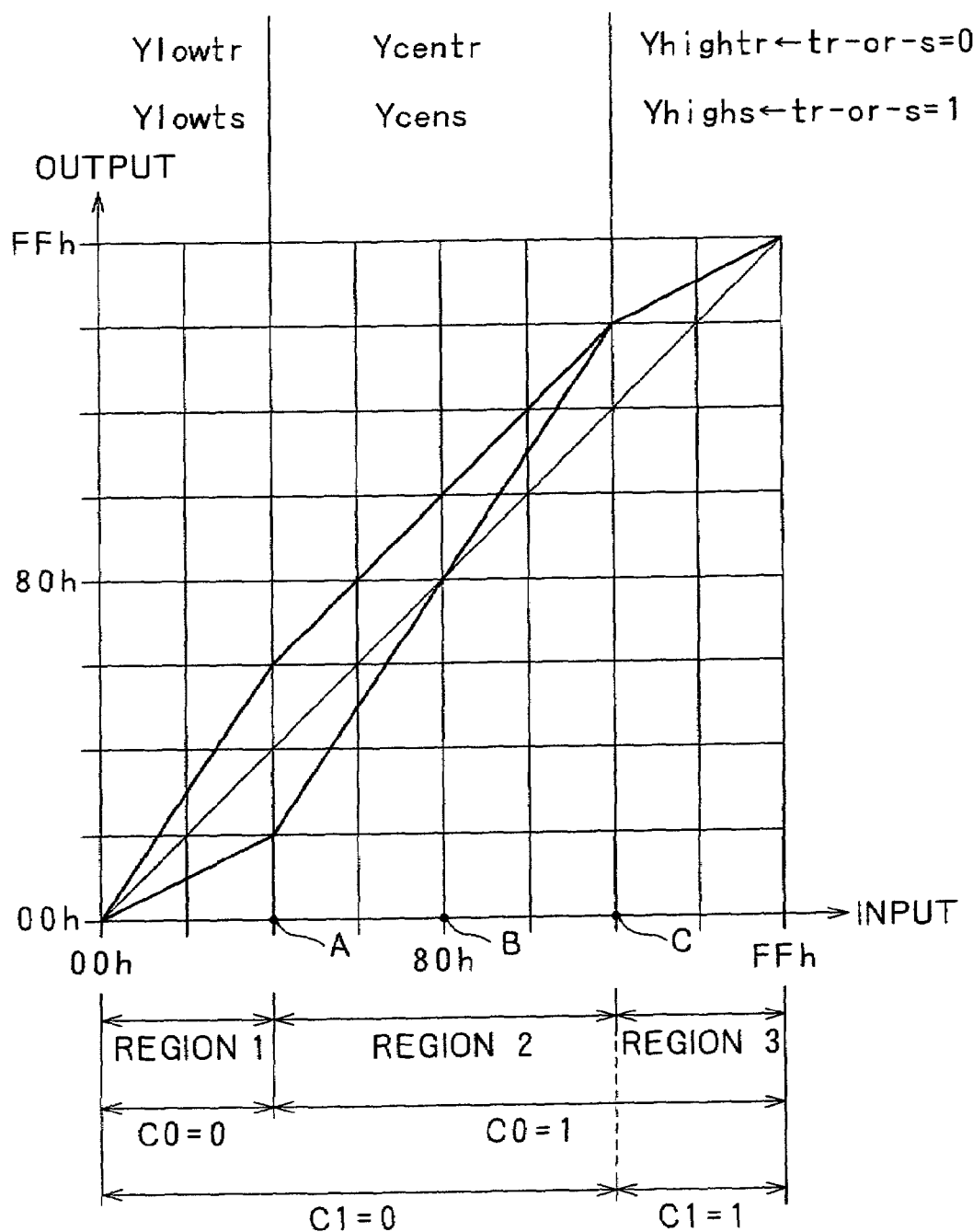

In the region 1 where the input data Yin is smaller than the boundary value A, as shown in FIG. 12, either signal Ylowtr or Ylows is selected when C0=0 and C1=0. Meanwhile, in the region 2 where the input data Yin is greater than the boundary value A but smaller than the boundary value C, either signal Ycentr or Ycens is selected when C0=1 and C1=0. And in the region 3 where the input data Yin is greater than the boundary value C, either signal Yhightr or Yhighs is selected when C0=1 and C1=1.

Consequently, there is obtained, as output data Yout of the multiplexer 44, the luminance data where the input data Yin has been corrected in accordance with either the trapezoidal characteristic of FIG. 1 or the S-shaped characteristic of FIG. 2 selected as mentioned above.

Each of the calculators 21, 22, 33, 38 in FIG. 4 and the calculators 24, 31, 32, 35 in FIG. 5 may consist of a bit shifter and an adder.

Figure 7:
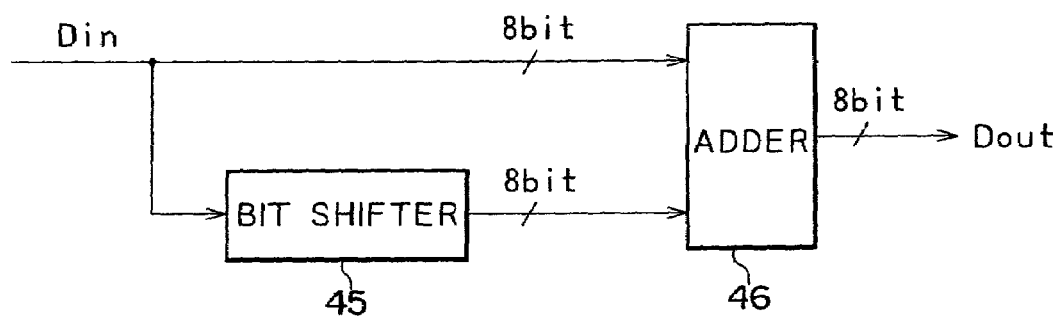

That is, the circuit for multiplying the input value by (1+Kg) as the calculator 21, 22, 33 or 38 may be so formed as shown in FIG. 7, wherein a bit shifter 45 shifts the input data Din to the low order side thereof, and then an adder 46 adds the shifted data and the input data Din to thereby produce output data Dout.

Figure 8:
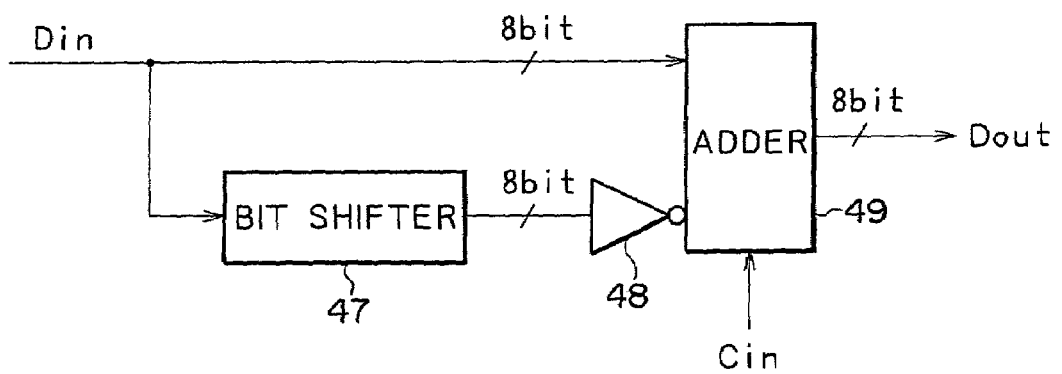

Also the circuit for multiplying the input value by (1−Ka) as the calculator 24, 31, 32 or 35 may be so formed as shown in FIG. 8, wherein a bit shifter 47 shifts the input data Din to the low order side thereof, and then an adder 49 adds the data obtained by inverting, in an inverter 48, each bit of the shifted data, and the input data Din to each other to thereby produce output data Dout.

For example, when the characteristic is such as denoted by a solid line in FIG. 1 or 2 with Kg=Ka=0.5, Gg=1.5 and Ga=0.5, the bit shifter 45 or 47 shifts the input data by one bit respectively to the low order side. Meanwhile, when the characteristic is such as denoted by a dotted line in FIG. 1 or 2 with Kg=Ka=0.25, Gg=1.25 and Ga=0.75, the bit shifter 45 or 47 shifts the input data by two bits respectively to the low order side. The gains Gg and Ga can be set to some other values by combining different bit shifters which shift the input data by one bit and two bits to the low order side.

The luminance correction method employing the above-described trapezoidal characteristic or S-shaped characteristic is applicable to a digital video reproducing apparatus such as a DVD player or to a digital video appliance such as a television receiver.

Figure 13:
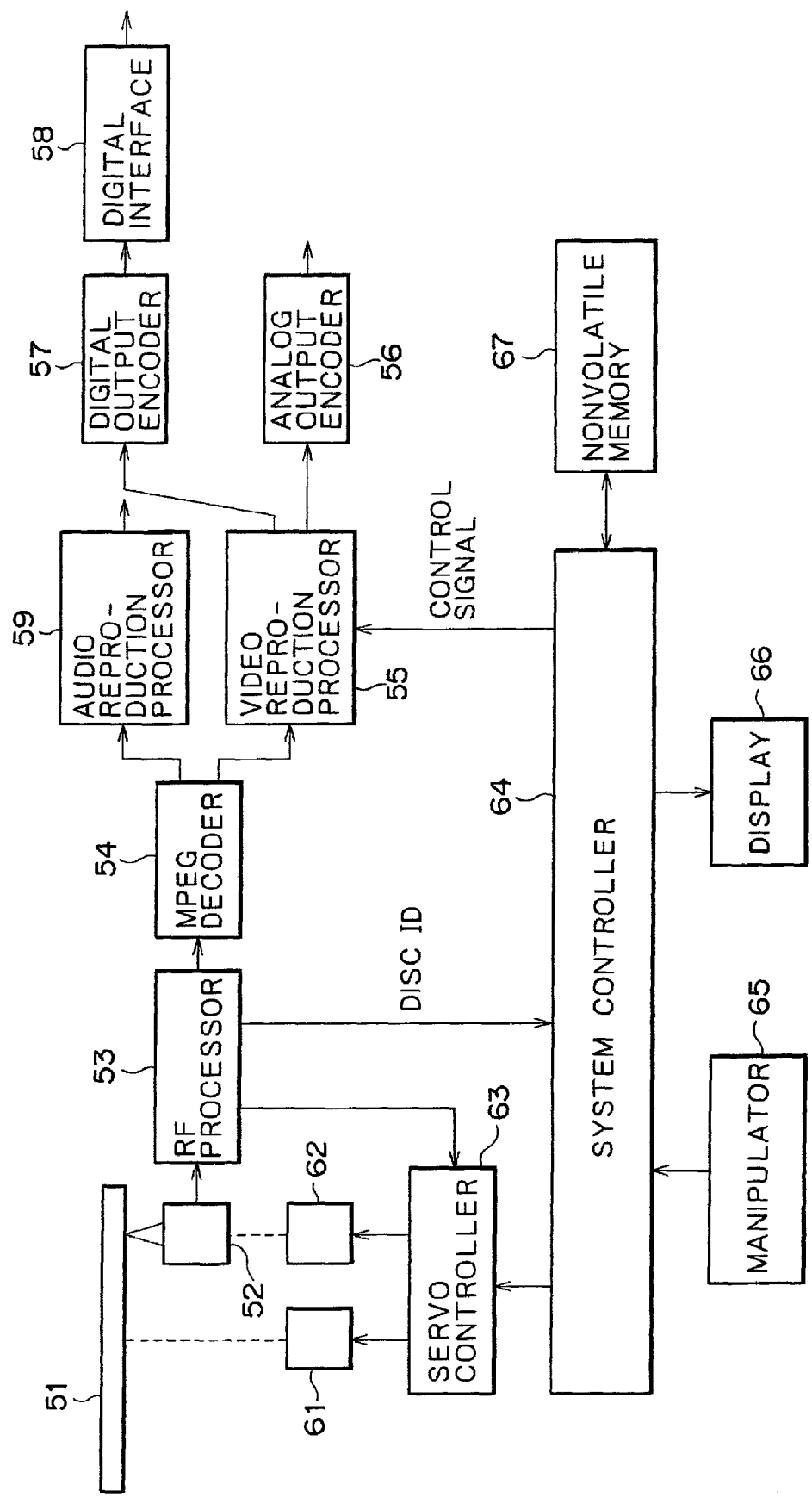
FIG. 13 shows an embodiment of the present invention applied to a DVD player.

FIG. 13 represents an exemplary case of applying the correction method to a DVD player, wherein video and audio signals are recorded on a disc 51 after being compressed, encoded and multiplexed in conformity with the standards of MPEG (Moving Picture Experts Group) 2 for example, and a disc ID (identification information) for specifying the disc is also recorded thereon.

The disc 51 is rotated by a drive mechanism 61 including a disc motor and its drive circuit. An optical head 52 is driven by a drive mechanism 62 including a feed motor and tracking and focusing actuators. The drive mechanisms 61 and 62 are under control of a servo controller 63, which is controlled by a system controller 64 serving to control the whole player system.

A manipulator 65 such as a remote controller is provided for the system controller 64, so that a user is enabled to perform luminance correction, color gain control and hue control of a reproduced picture by means of the manipulator 65, And a display 66 equipped with a display element such as a liquid crystal display element is also provided for the system controller 64.

Further, a nonvolatile memory 67 such as an EAROM (Electrically Alterable Read Only Memory) or a flash memory is provided so that parameter data for the above control can be written in or read out therefrom. In this case, the nonvolatile memory 67 connotes any memory capable of holding its stored contents without a power supply or with a backup power supply.

The output of the optical head 52 representing the information read out from the disc 51 is supplied to an RF processor 53, which then processes the information to output a tracking error signal, a focus error signal, disc ID, and a video-audio data stream based on the MPEG2 standards.

The tracking error signal and the focus error signal are supplied to the servo controller 63 so as to be used for tracking servo control and focusing servo control of the optical head 52.

The disc ID is inputted into the system controller 64 to be used for execution of the above control, as will be described later.

The video-audio data stream obtained from the RF processor 53 is separated into a video data stream and an audio data stream by an MPEG decoder 54, and then such data steams are expanded and decoded.

The output video data from the MPEG decoder 54 is separated into luminance data and color difference data by a video reproduction processor 55 as will be described later, and the luminance data is processed to execute contour emphasis and luminance correction, while the color difference data is processed to execute color gain control and hue control. Thereafter the luminance data and the color difference data are combined with each other to obtain video data identical in format with the video data inputted into the video reproduction processor 55.

The output video data obtained from the video reproduction processor 55 is converted by an analog output encoder 56 into analog video signal of the NTSC, PAL or progressive system, and then is outputted to an image display device such as a CRT display, a liquid crystal display or a video projector, and also to an analog video-audio appliance such as an analog television receiver, or some other analog video appliance.

Meanwhile, the output video data from the video reproduction processor 55 is converted, or not converted, into video data of another format by a digital output encoder 57, and is outputted to a digital video-audio appliance such as a digital television receiver or to some other digital video appliance via a digital interface 58 such as one conforming with the IEEE (Institute of Electrical and Electronics Engineers) 1394 standards.

The output audio data from the MPEG decoder 54 is processed for audio reproduction by an audio reproduction processor 59 and, although omitted in the diagram, the audio data is converted into analog audio signal in synchronism with the output video data obtained from the video reproduction processor 55, and the analog audio signal is outputted to an audio output device such as a speaker unit or a headphone unit, and also to an analog video-audio appliance such as an analog television receiver, or to some other analog audio appliance. Meanwhile, the analog audio signal is converted, or not converted, into audio data of another format, and then is outputted, via a digital interface 58 after being multiplexed with the video data, or via another digital interface without being multiplexed with the video data, to a digital video-audio appliance such as a digital television receiver, or to some other digital audio appliance.

Figure 14:
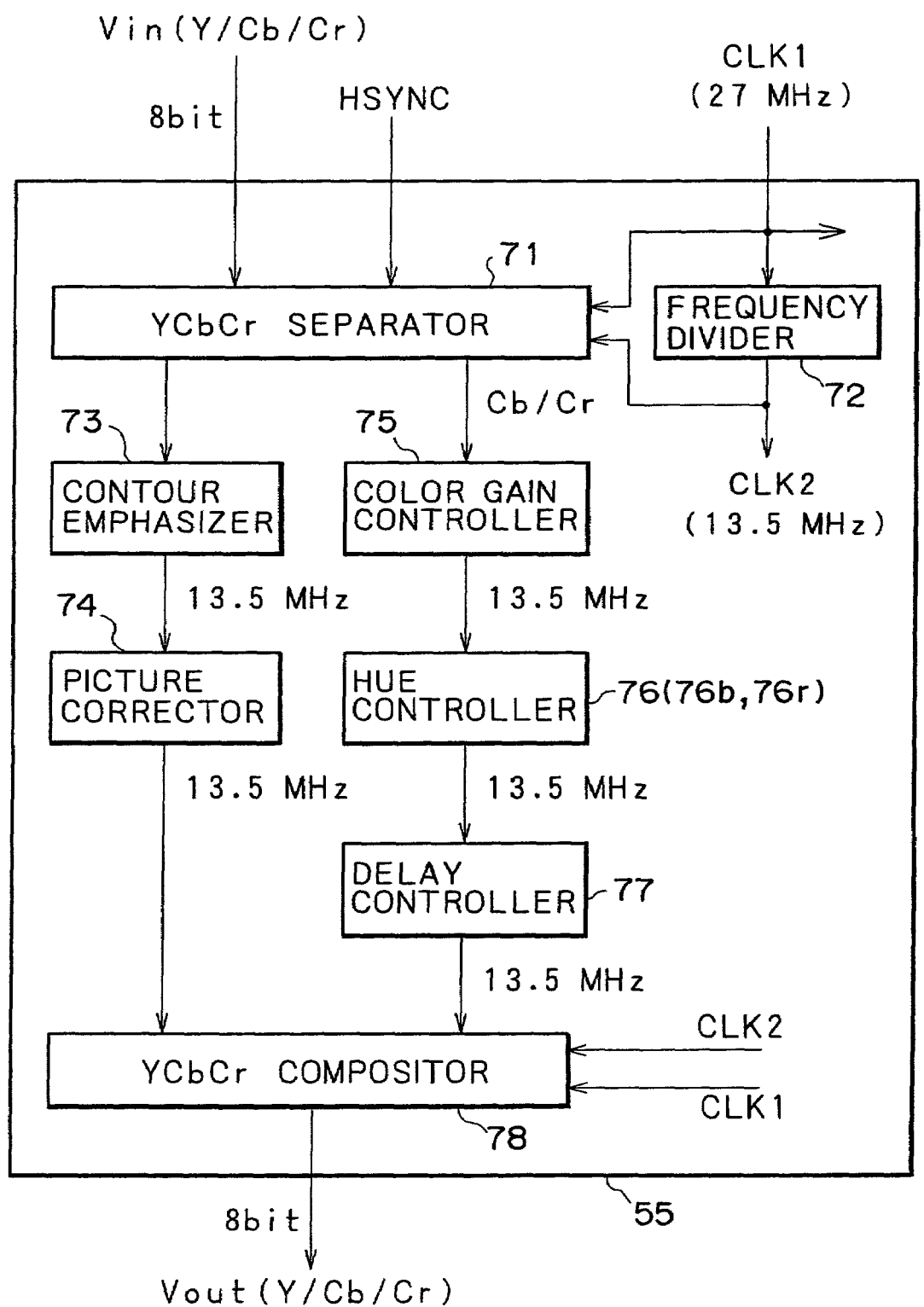
FIG. 14 shows an example of a video reproduction processor.
Figure 15:
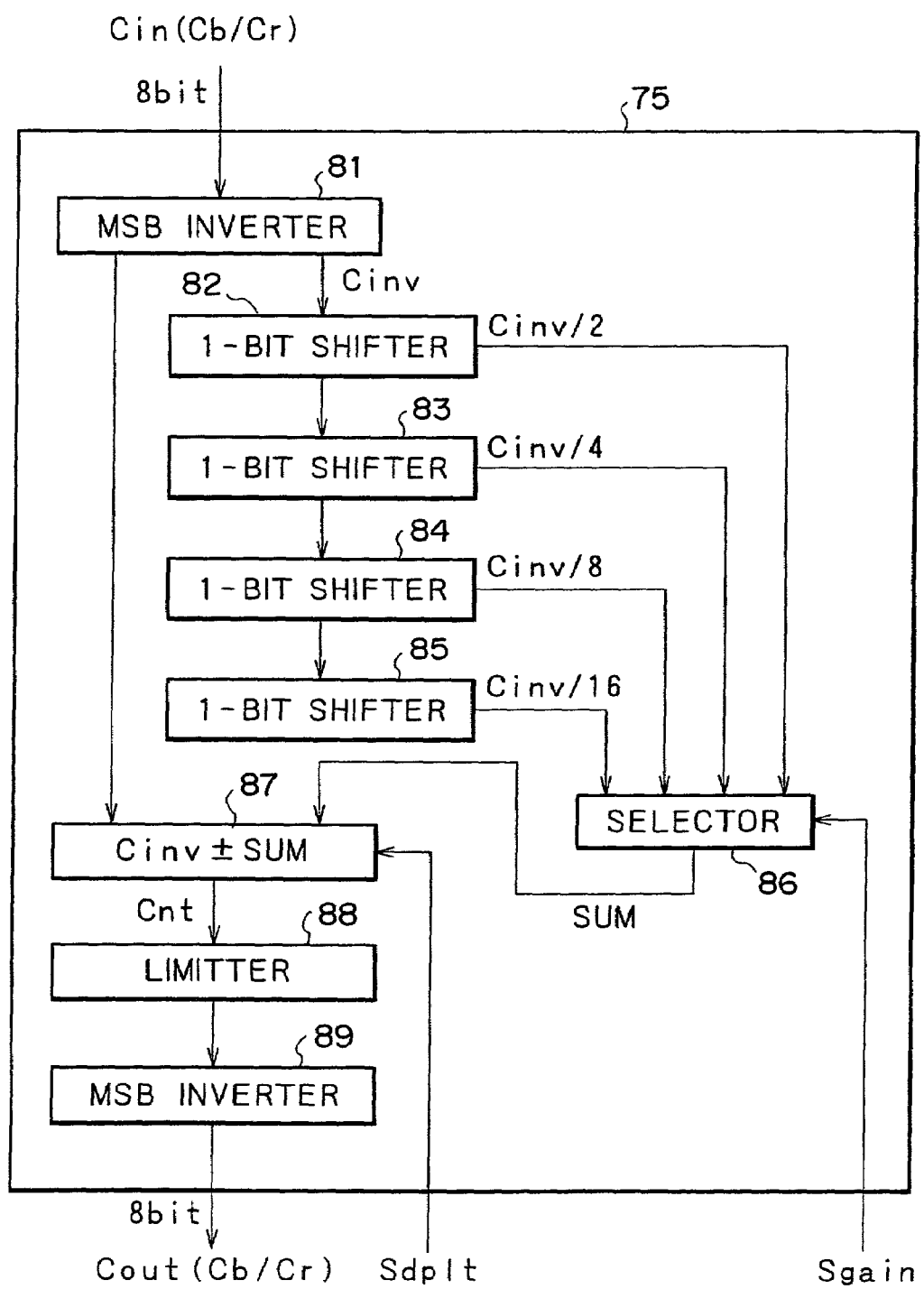
FIG. 15 shows an example of a color gain controller.
Figure 17:
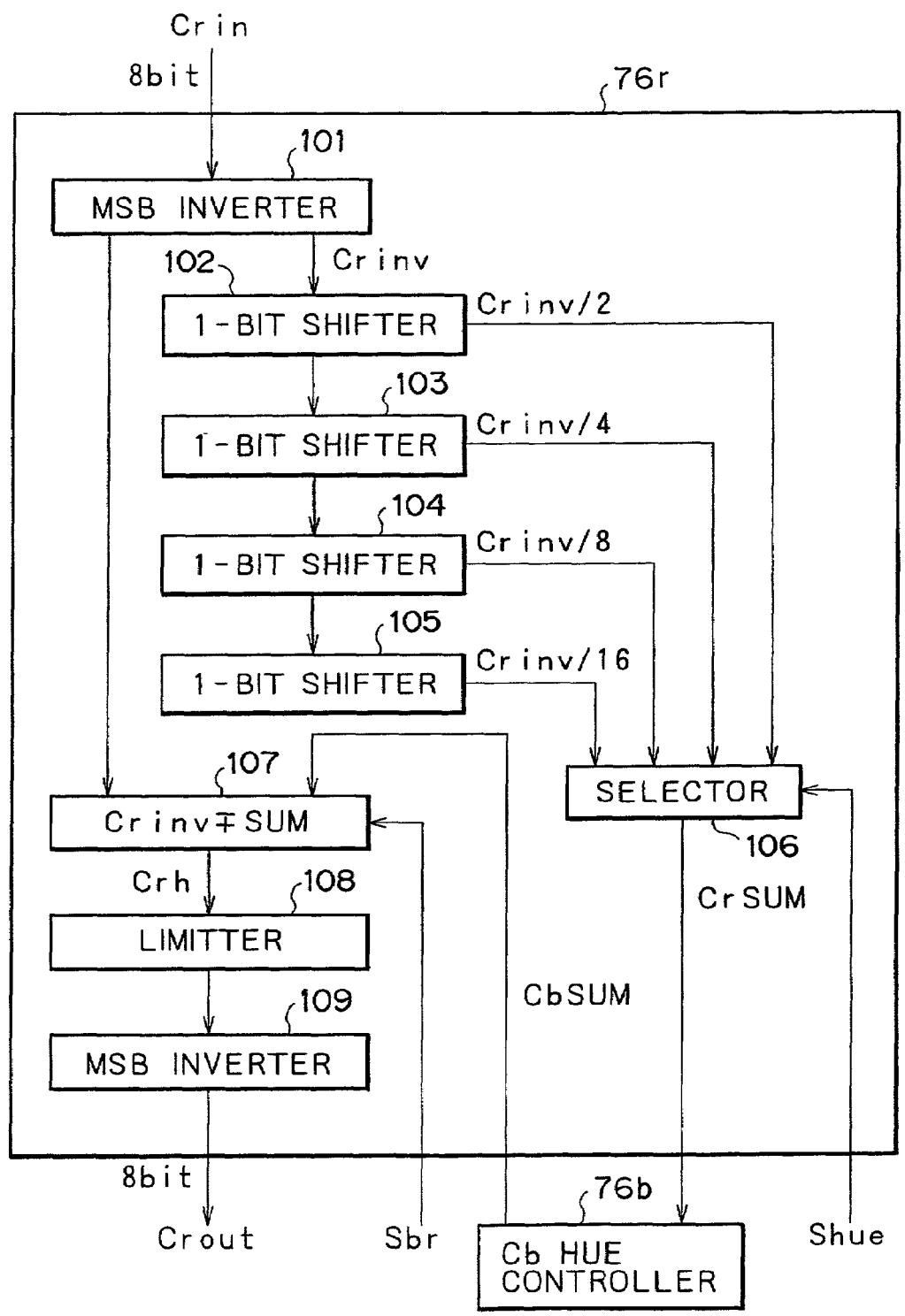
FIG. 17 shows a partial example of another hue controller.

FIG. 14 shows an example of the video reproduction processor 55, and FIGS. 15, 16 and 17 show examples of a color gain control circuit 75, a Cb hue control circuit 76b and a Cr hue control circuit 76r, respectively, in the video reproduction processor 55.

Figure 18A:
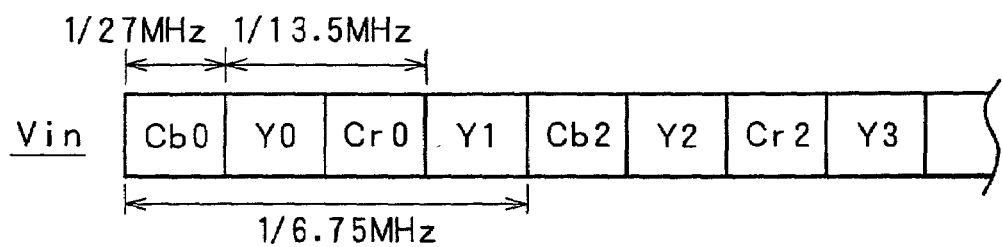
FIGS. 18A to 18C are diagrams for explaining data processing executed in the video reproduction processor.

Video data Vin inputted to the video reproduction processor 55 from the MPEG decoder 54 are composed of 8-bit data where, as shown in FIG. 18A, luminance data Y (Y0, Y1, Y2, Y3 . . . ), color difference data Cb (Cb0, Cb2 . . . ) and color difference data Cr (Cr0, Cr2 . . . ) of 4:2:2 format (sampling frequency of luminance data Y is 13.5 MHz, and sampling frequency of color difference data Cb and Cr is 6.75 MHz) are multiplexed.

In the video reproduction processor 55, a YCbCr separator 71 separates the input video data Vin into the luminance data Y and the color difference data Cb and Cr.

In this case, the positions of the data Y, Cb and Cr in the video data Vin are determined by the phase of a horizontal synchronizing signal HSYNC which is inputted to the video reproduction processor 55 together with the video data Vin and is based on a clock CLK1 of 27 MHz.

In the YCbCr separator 71, a trailing edge of the horizontal synchronizing signal HSYNC is detected, and a 2-bit counter is started from point "0" where the trailing edge is latched by the clock CLK1. Subsequently the respective positions of the data Y, Cb and Cr are determined by the counter value when the video data Vin have been latched by the clock CLK1, and then the data Y, Cb and Cr are separated.

As shown in FIG. 18A, in the video data Vin, data Y0 has a delay of one clock pulse from data Cb0, and data Cr0 has a delay of two clock pulses. Therefore, in order to attain synchronism with the phase of data Cr, the separated data Cb is delayed by two clock pulses, and the separated data Y is delayed by one clock pulse respectively.

Meanwhile, the clock CLK1 of 27 MHz is supplied to a frequency divider 72, which then generates a clock CLK2 of 13.5 MHz. In this case, mere frequency division of the clock CLK1 renders the phase of clock CLK2 unstable. Therefore in the frequency divider 72, as in the aforementioned YCbCr separator 71, a 1-bit counter is started from point "0" where the trailing edge of the horizontal synchronizing signal HSYNC is latched by the clock CLK1, and the phase of clock CLK2 is settled under control by the counter value when the clock CLK2 has been latched by the clock CLK1.

Figure 18B:
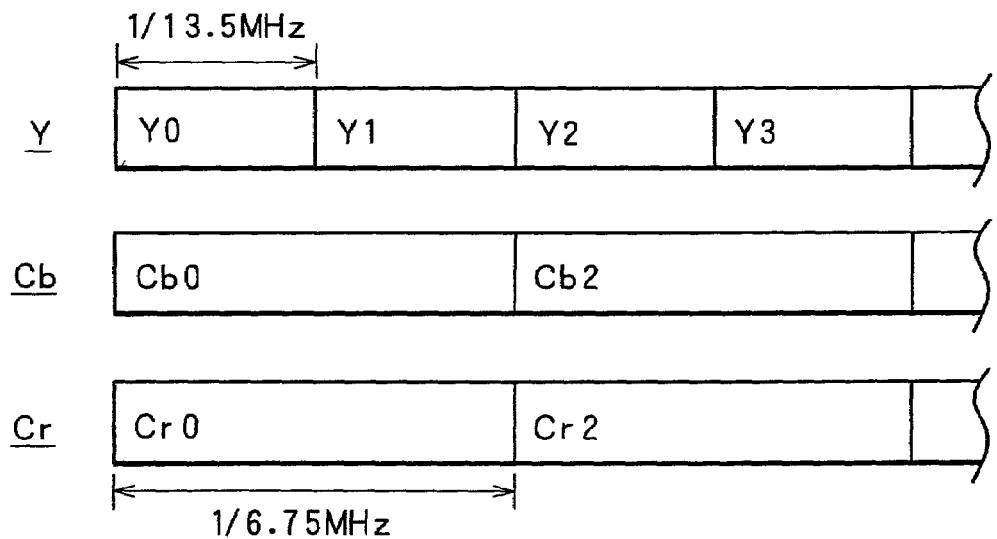

Subsequently the clock CLK2 of 13.5 MHz thus settled with regard to its phase is supplied to the YCbCr separator 71, which then produces in-phase data Y, Cb and Cr as shown in FIG. 18B with a clock frequency of 13.5 MHz.

The luminance data Y separated in the YCbCr separator 71 are processed for contour emphasis in a contour emphasizer 73.

The luminance data Y outputted from the contour emphasizer 73 are supplied to a picture corrector 74 which executes a process of luminance correction. That is, the picture corrector 74 corresponds to the luminance corrector shown as an example in FIGS. 3–6, and corrects the output luminance data Y of the contour emphasizer 73 in accordance with the aforementioned trapezoidal characteristic or S-shaped characteristic.

However, in the player system of FIG. 13, there is adopted a 4:2:2 8-bit format which conforms with ITU-R BT. 601 recommended by ITU (International Telecommunication Union), wherein the relationship between video signal levels and quantization levels is such that, when the quantized signal level ranges from 1 to 254, the luminance data Y are set to 220 levels of "16:black, 235:white peak", and the color difference data Cb and Cr are set to 225 levels of "128: achromatic color".

Therefore, the correction characteristics of the picture corrector 74, i.e., the trapezoidal characteristic and the S-shaped characteristic, are actually changed to be different from those shown in FIGS. 1, 2 and 9 to 12, in such a manner that, under the conditions where the minimum value of the input data is 16 (10h) and the maximum value thereof is 235 (EBh), an intermediate value B and boundary values A, C are set, and after regions 1, 2, 3 are set, linear portions L1, L2, L3 and linear portions S1, S2, S3 are set. Then the post-correction luminance data Yout are limited to 16 (10h) –235 (EBh) and are outputted from the picture corrector 74.

However, in the United States, there is a case where luminance data under 16 (10h) are written in a disc with a setup of 7.51 RE attached. In case any luminance data under 16 (10h) are included in the video data Vin inputted to the video reproduction processor 55, such data are outputted from the picture corrector 74 while the value thereof is maintained.

The color difference data Cb and Cr separated in the YCbCr separator 71 are processed for color gain control in a color gain controller 75.

The color gain control is so executed as to change the inclinations of the color difference data Cb and Cr in a direction to increase or decrease the chroma from the achromatic value 128 (80h), as given below:

$$Cout = (1+\alpha) Cin \text{ (where } -1 \leq \alpha \leq 1)$$

in which Cin denotes the pre-control color difference data Cb and Cr, and Cout denotes the post-control color difference data Cb and Cr.

With regard to the color gain control, both the color difference data Cb and Cr are processed exactly in the same manner. However, in a rear-stage hue controller 76, the color difference data Cb and Cr need to be processed separately. For this reason, in regard of the color gain control also, the color difference data Cb and Cr are processed separately. Therefore, the color gain controller 75 of FIG. 15 is provided for each of the color difference data Cb and Cr.

In the color gain controller 75 of FIG. 15, the MSB of the 8-bit input color difference data Cin is inverted by an MSB inverter 81, so that the MSB is turned into a code bit, and the input color difference data Cin of 0 to 255 (FFh) are converted into data Cinv of −127 (−7 Fh) to +127 (+7 Fh). Consequently, the achromatic color value 128 (80h) of the input color difference data Cin can be turned into a value 0 in the post-conversion data Cinv which serves as a center for changing the inclination.

The post-conversion data Cinv thus obtained are shifted bit by bit to the low-order side sequentially in bit shifters 82, 83, 84 and 85, which thereby generate ½, ¼, ⅛ and ¹⁄₁₆ data of the data Cinv respectively. However, since the MSB is a code bit, a copy of this code bit is shifted in when the respective data are bit-shifted.

Such ½, ¼, ⅛ and ¹⁄₁₆ data of the data Cinv are supplied to a selector 86 as components to change the inclinations, and one of these data is selected as a component to determine the inclination in accordance with a 2-bit control signal Sgain sent to the selector 86, as will be described later.

Subsequently in a calculator 87, according to the value of a 1-bit control signal Sdplt sent thereto, output data SUM of the selector 86 is added to the output data Cinv of an MSB inverter 81 when Sdplt=0, or the data SUM is subtracted from the data Cinv when Sdplt=1.

In this case, each MSB of the data Cinv and SUM is copied to the relevant 9th bit to thereby extend each of the data Cinv and SUM to 9 bits.

The output 9-bit data Cnt of the calculator 87 is limited in value by a limiter 88. With a definition of "225 levels, 128:achromatic color", it is supposed that the dynamic range of the color difference data Cb and Cr is from 16 (10h) to 240 (F0h).

Accordingly, in limiting the value of the 9-bit data Cnt, considering that its 8th bit is to be inverted later, Cnt=112 (70h) when 113 (71h)≦Cnt≦255 (FFh), or Cnt=400 (190h) when 256 (100h)≦Cnt≦399 (18 Fh)

The 9-bit data Cnt obtained after such limitation of the value in the limiter 88 is turned into 8-bit data with its 9th bit truncated in an MSB inverter 89, and its 8th bit is inverted therein to produce post-control color difference data Cout processed for color gain control, and then such data Cout is outputted from the color gain controller 75.

The post-control color difference data Cb and Cr outputted after the color gain control from the color gain controller 75 of FIG. 14 are processed for hue control in the hue controller 76.

Hue control is executed to change the inclinations of the color difference data Cb and Cr in mutually reverse directions from the center value 128 (80h) of achromatic color. In this example, $$Cbout = Cbin + \beta Crin$$

$$Crout = Crin - \beta Cbin \text{ (where } -1 \leq \beta \leq 1)$$

in which Cbin and Crin denote the pre-control color difference data Cb and Cr respectively, and Cbout and Crout denote the post-control color difference data Cb and Cr respectively.

In a Cb hue controller 76b of FIG. 16 and a Cr hue controller 76r of FIG. 17, MSBs of 8-bit input color difference data Cbin and Crin are inverted by MSB inverters 91 and 101 respectively and, while the achromatic color value 128 (80h) of the input color difference data Cbin and Crin is regarded as 0 in the post-MSB-inversion data Cbinv and Crinv to change the inclinations, component data for changing the inclinations are produced by bit shifters 92 to 95 and 102 to 105 respectively, in the same manner as in the aforementioned color gain controller 75 of FIG. 15.

In the Cb hue controller 76b, the component data for changing the inclination are supplied to a selector 96 and, in accordance with the value of a 2-bit control signal Shue sent to the selector 96 as will be described, one data is selected as a component to determine the inclination degree. Meanwhile in the Cr hue controller 76r, the component data for changing the inclination are supplied to a selector 106 and, in accordance with the value of the 2-bit control signal Shue, one data is selected as a component to determine the inclination degree.

Further in a calculator 97 of the Cb hue controller 76b, in accordance with the value of a 1-bit control signal Sbr sent to the calculator 97, output data CrSUM from the selector 106 of the Cr hue controller 76r is added to the output data Cbinv of the MSB inverter 91 when Sbr=0, or the data CrSUM is subtracted from the data Cbinv when Sbr=1.

Contrary to the above, in a calculator 107 of the Cr hue controller 76r, in accordance with the value of the 1-bit control signal Sbr, output data CbSUM from the selector 96 of the Cb hue controller 76b is subtracted from the output data Crinv of the MSB inverter 101 when Sbr=0, or the data CbSUM is added to the data Crinv when Sbr=1.

In this case also, each MSB of the data Cbinv, CrSUM, Crinv and CbSUM is copied to the relevant 9th bit to thereby extend each of the data Cbinv, CrSUM, Crinv and CbSUM to 9 bits.

The output 9-bit data Cbh from the calculator 97 of the Cb hue controller 76b is limited in value by a limiter 98, and also the output 9-bit data Crh from the calculator 107 of the Cr hue controller 76r is limited in value by a limiter 108. With a definition of "225 levels, 128:achromatic color", it is supposed that, as described before, the dynamic range of the color difference data Cb and Cr is from 16 (10h) to 240 (F0h).

Accordingly, in limiting the values of the 9-bit data Cbh and Crh, considering that each 8th bit thereof is to be inverted later, Cbh, Crh=112 (70h) when 113 (71h)≦Cbh, Crh≦255 (FFh), or Cbh, Crh=400 (190h) when 256 (100h)≦Cbh≦399 (18Fh)

The 9-bit data Cbh and Crh obtained after such limitation of the values in the limiters 98 and 108 are turned into 8-bit data with the 9th bits thereof truncated in MSB inverters 99 and 109 respectively, then the 8th bits are inverted therein to produce post-control color difference data Cbout and Crout processed for hue control, and such data Cbout and Crout are outputted from the Cb hue controller 76b and the Cr hue controller 76r respectively, i.e., from the hue controller 76 of FIG. 14.

In the video reproduction processor 55 of FIG. 14, the luminance data Y and the color difference data Cb, Cr outputted from the YCbCr separator 71 are synchronous in phase, as shown in FIG. 18B. However, there occurs a difference between the number of latches of the luminance data Y in the contour emphasizer 73 and the picture corrector 74, and the number of latches of the color difference data Cb, Cr in the color gain controller 75 and the hue controller 76. More specifically, the former number becomes greater. For this reason, the color difference data Cb and Cr outputted from the hue controller 76 are latched in a delay controller 77 correspondingly to a predetermined number of clock pulses CLK2 of 13.5 MHz, in such a manner that the color difference data Cb and Cr are synchronized in phase with the luminance data Y outputted from the picture corrector 74.

And subsequently the output luminance data Y of the picture corrector 74 and the output color difference data Cb, Cr of the delay controller 77, which are synchronous in phase as shown in FIG. 18B, are composited and multiplexed in a YCbCr compositor 78.

Figure 18C:
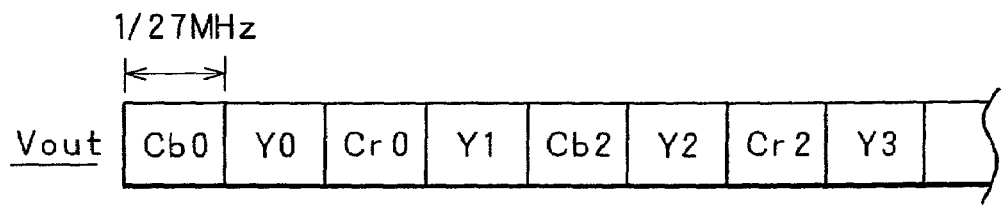

In this case, the data Cr in the composited video data Vout is delayed by two pulses of the clock CLK1 of 27 MHz while the data Y therein is delayed by one pulse of the clock CLK1 so that, as shown in FIG. 18C, the phase relationship among the data Y, Cb, Cr becomes the same as that in the video data Vin of FIG. 18A inputted to the video reproduction processor 55.

Further, as in the YCbCr separator 71, a trailing edge of the horizontal synchronizing signal HSYNC is detected, and a 2-bit counter is started from point "0" where the trailing edge is latched by the clock CLK1 of 27 MHz. Subsequently the respective positions of the data Y, Cb and Cr are determined by the counter value when the video data Vout have been latched by the clock CLK1, and then the video data Vout are outputted from the YCbCr compositor 78, i.e., from the video reproduction processor 55.

In the player system of FIG. 13 having the configuration mentioned above, the system is so contrived that, in response to a user's operation of actuating the manipulator 65, either a correction mode based on the trapezoidal characteristic or another correction mode based on the S-shaped characteristic can be selected for luminance correction in a state where a reproduced picture is displayed on an image display device connected to the player system.

In displaying a reproduced picture on a video projector for example, if there occurs black floating where a nearly black level portion is rendered whitish, the correction mode based on the S-shaped characteristic can be selected. Meanwhile, when it is desired to raise the luminance in displaying a reproduced picture on a CRT display device or a liquid crystal display device, the correction mode based on the trapezoidal characteristic can be selected.

Further, the system is so contrived that color gain control can be executed by actuating the manipulator 65 at four grades in either direction of raising or lowering the chroma, and also that hue control can be executed at four grades in either direction of emphasizing blue or red.

The system controller 64 detects the actuation in the manipulator 65 and then sends a control signal, which represents the detected actuation, to each of the circuits in the video reproduction processor 55, thereby enabling each circuit to execute a control action corresponding to the actuation.

More specifically, in case one correction mode based on the trapezoidal characteristic has been selected for luminance correction, a trapezoidal/S-shape selection signal is set as tr-or-s=0. Meanwhile, in case another correction mode based on the S-shaped characteristic has been selected for luminance correction, this signal is set as tr-or-s=1. And then the selection signal tr-or-s is sent to the select terminal c of the multiplexer 44 which is shown in FIG. 6 and is included in the picture corrector 74 of FIG. 14.

Consequently, in one case of selection of the correction mode based on the trapezoidal characteristic, the trapezoidal characteristic is selected for luminance correction, and the luminance data Y are corrected in the picture corrector 74 in accordance with the trapezoidal characteristic shown in FIG. 1. Meanwhile, in another case of selection of the correction mode based on the S-shaped characteristic, the S-shaped characteristic is selected for luminance correction, and the luminance data Y are corrected in the picture corrector 74 in accordance with the S-shaped characteristic shown in FIG. 2.

When the color gain control has been adjusted in a direction to raise the chroma, a control signal Sdplt is set as Sdplt=0. When the color gain control has been adjusted in a direction to lower the chroma, this signal is set as Sdplt=1. And then the control signal Sdplt is sent to the calculator 87 which is shown in FIG. 15 and is included in the color gain controller 75 of FIG. 14. Meanwhile a 2-bit control signal Sgain is set to 0, 1, 2 or 3 in accordance with the control grade and then is sent to the selector 86 shown in FIG. 15.

Consequently, in the color gain controller 75, the color difference data Cb and Cr are processed for color gain control as described.

Further, when the hue control has been adjusted in a direction to emphasize blue, a control signal Sbr is set as Sbr=0. When the hue control has been adjusted in a direction to emphasize red, this signal is set as Sbr=1. And the control signal Sbr is sent to the calculator 97 shown in FIG. 16 and also to the calculator 107 in FIG. 17 which are both included in the hue controller 76 of FIG. 14. Meanwhile a 2-bit control signal Shue is set to 0, 1, 2 or 3 in accordance with the control grade, and then is sent to the selector 96 shown in FIG. 16 and also to the selector 106 in FIG. 17.

Consequently, in the hue controller 76, the color difference data Cb and Cr are processed for hue control as described.

Further the player system of FIG. 13 is so contrived that, when a desired control action has been executed during reproduction of a disc in response to the user's manipulation as mentioned, the system controller 64 writes the control signal state as a control parameter in the nonvolatile memory 67 correspondingly to the disc ID, and when the same disc is reproduced next time, the system controller 64 reads out, from the nonvolatile memory 67, the control parameter corresponding to the disc, and then sets the control signal in the same state as at the previous setting performed in accordance with the user's manipulation for control.

Thus, it becomes possible for the user to always obtain an optimal reproduced picture without the necessity of a repeated control manipulation for each reproduction of the same disc.

Figure 19:
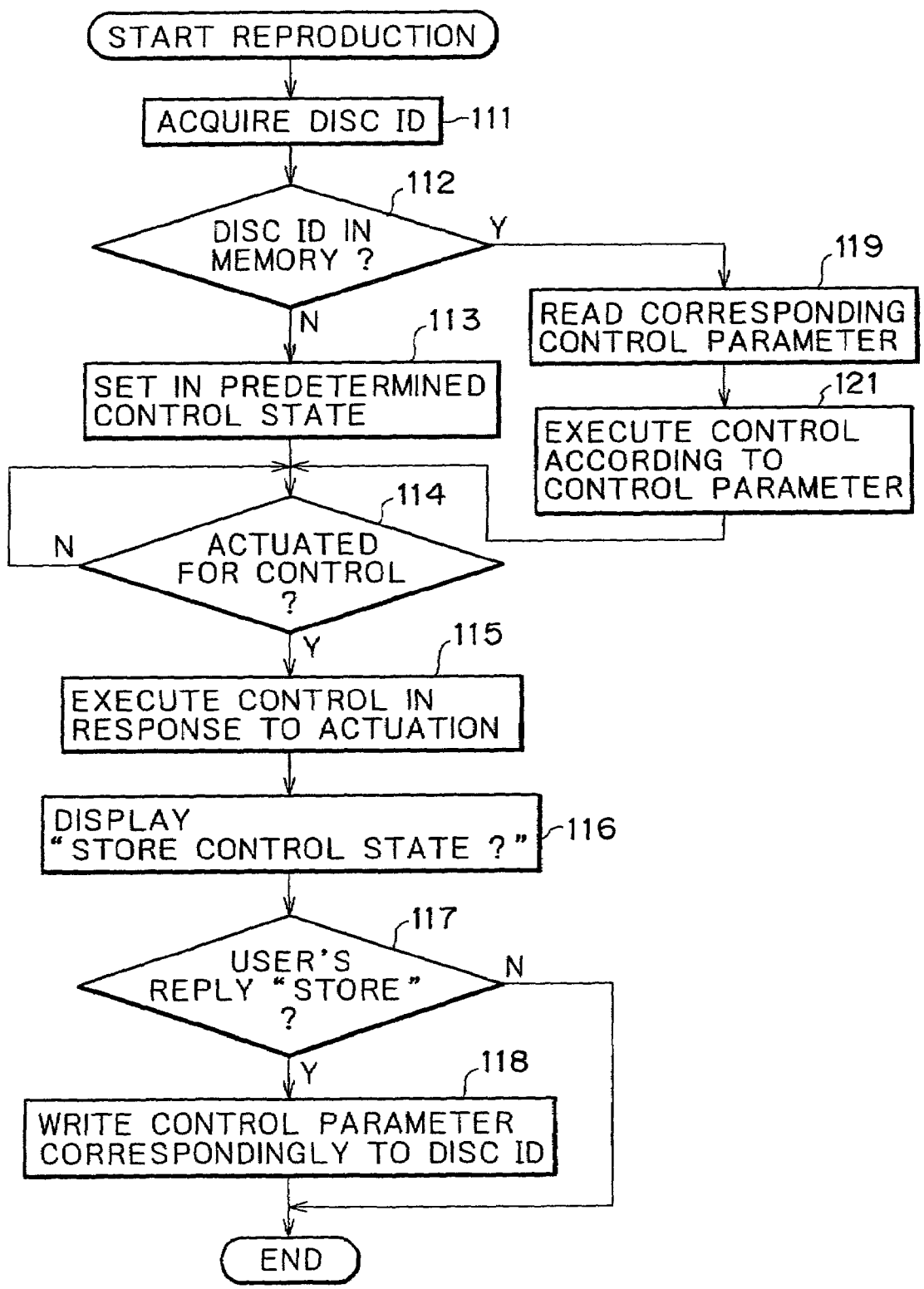
FIG. 19 is a flowchart of an exemplary control processing routine executed in a system controller.

FIG. 19 shows an example of such control processing routine executed in the system controller 64.

After start of reproducing a disc in this processing routine, first the disc ID is acquired at step 111, and then a decision is made at step 112 as to whether the disc ID is stored or not in the nonvolatile memory 67.

And if the result of this decision signifies that the disc ID is not stored in the nonvolatile memory 67, the operation proceeds to step 113, where luminance correction, color gain control and hue control are set in predetermined states. For example, luminance correction is set in one correction mode based on the trapezoidal characteristic and selected as a preferential mode.

Subsequently the operation proceeds to step 114, where a decision is made as to whether the user has actuated the manipulator or not for control. And if the result of this decision is affirmative, the operation proceeds to step 115, where a desired control action is executed in accordance with the user's actuation of the manipulator as described. Thereafter the operation further proceeds to step 116, where an inquiry is displayed on the display unit 66 to ask the user about whether the present control state needs to be stored or not as a disc control state.

If the user desires storage of the present control state as a disc control state, the user actuates the manipulator correspondingly thereto to store the present control state that indicates, for example, selection of the correction mode based on the S-shaped characteristic for displaying a reproduced picture on a video projector. In case the user does not desire storage of the present control state as a disc control state, the user actuates the manipulator correspondingly thereto.

Then in the system controller 64, the operation proceeds from step 116 to step 117, where a decision is made, in response to the user's reply, as to whether the user desires storage or not. And if the result of this decision is affirmative to signify that storage is desired, the operation proceeds from step 117 to step 118, where the present state of the control signal is written as a control parameter in the nonvolatile memory 67 correspondingly to the disc ID. On the other hand, if the result of the above decision made in response to the user's reply is negative to signify that storage is not desired, the control processing routine is terminated.

Meanwhile, when the result of the decision at step 112 signifies that the disc ID is stored in the nonvolatile memory 67, the operation proceeds to step 119 to read out, from the nonvolatile memory 67, the control parameter corresponding to the disc ID. Then the operation proceeds to step 121 where a required control action is executed in accordance with the control parameter. And subsequently the operation proceeds to step 114.

The user is permitted to change the control action executed according to the control parameter stored in the nonvolatile memory 67 correspondingly to the relevant disc. When the user has actuated the manipulator for changing the control action, the system controller 64 executes the same processing as the first one with regard to the relevant disc at step 115 and subsequent steps, and then rewrites the control parameter at step 118.

In recording video data on a disc, scene ID (identification information) to specify a video scene can be recorded in combination with the video data.

The system configuration may be so contrived that, when reproducing the disc where such scene ID is recorded, the system controller 64 writes, after the above control action, the control parameter in the nonvolatile memory 67 correspondingly to the scene ID as well as to the disc ID. And when reproducing the same disc next time, the system controller 64 reads out, from the nonvolatile memory 67, the control parameter corresponding to both the relevant disc and the video scene, and then sets a control state.

Accordingly, with regard to the same disc, the user is always enabled to obtain an optimal reproduced picture per video scene without the necessity of performing a repeated control actuation in each reproduction and per video scene.

In addition to such disc ID and scene ID that represent video identification information to specify relevant video images, it is further possible to record, on the disc, characteristic descriptive information that describes the image characteristic relative to the whole disc or scenes. In this case, a control parameter may be written in the nonvolatile memory 107 correspondingly to the characteristic descriptive information, and when reproducing the disc or scene where the same characteristic descriptive information is recorded, the control parameter corresponding to such characteristic descriptive information may be read out from the nonvolatile memory 107, and then a control state may be set.

The control method mentioned above is applicable also to a digital video appliance such as a digital television receiver, as well as to a digital video reproducing apparatus such as a DVD player.

In digital television broadcasting, it is possible to transmit, together with video identification information including program ID and genre (category) ID, the above characteristic descriptive information that describes the image characteristic relative to the program or scene, by inserting the latter information in the program or scene.

For this purpose, the digital television receiver may be equipped with a memory equivalent to the nonvolatile memory 67, wherein, in response to a command from the user, the system controller writes the control parameter in the memory correspondingly to the relevant video identification information or characteristic descriptive information. And upon reception of any program or scene where the same video identification information or characteristic descriptive information is inserted, the control parameter corresponding to such video identification information or characteristic descriptive information is read out from the memory, and then a control state is set.

The embodiment mentioned above represents a mere example where either one correction mode based on the trapezoidal characteristic or another correction mode based on the S-shaped characteristic is selectable for luminance correction. And a modification thereof may be so contrived that the picture corrector 74 of FIG. 14, e.g., the luminance corrector shown in FIGS. 3 to 6, is capable of selecting, with regard to the trapezoidal characteristic, either the characteristic of a relatively higher correction degree denoted by a solid line in FIG. 1 or the characteristic of a relatively lower correction degree denoted by a broken line therein. Further with regard to the S-shaped characteristic, the luminance corrector is capable of selecting either the characteristic of a relatively higher correction degree denoted by a solid line in FIG. 2 or the characteristic of a relatively lower correction degree denoted by a broken line therein. Thus, the degree of luminance correction is also rendered selectable.

Figure 20:
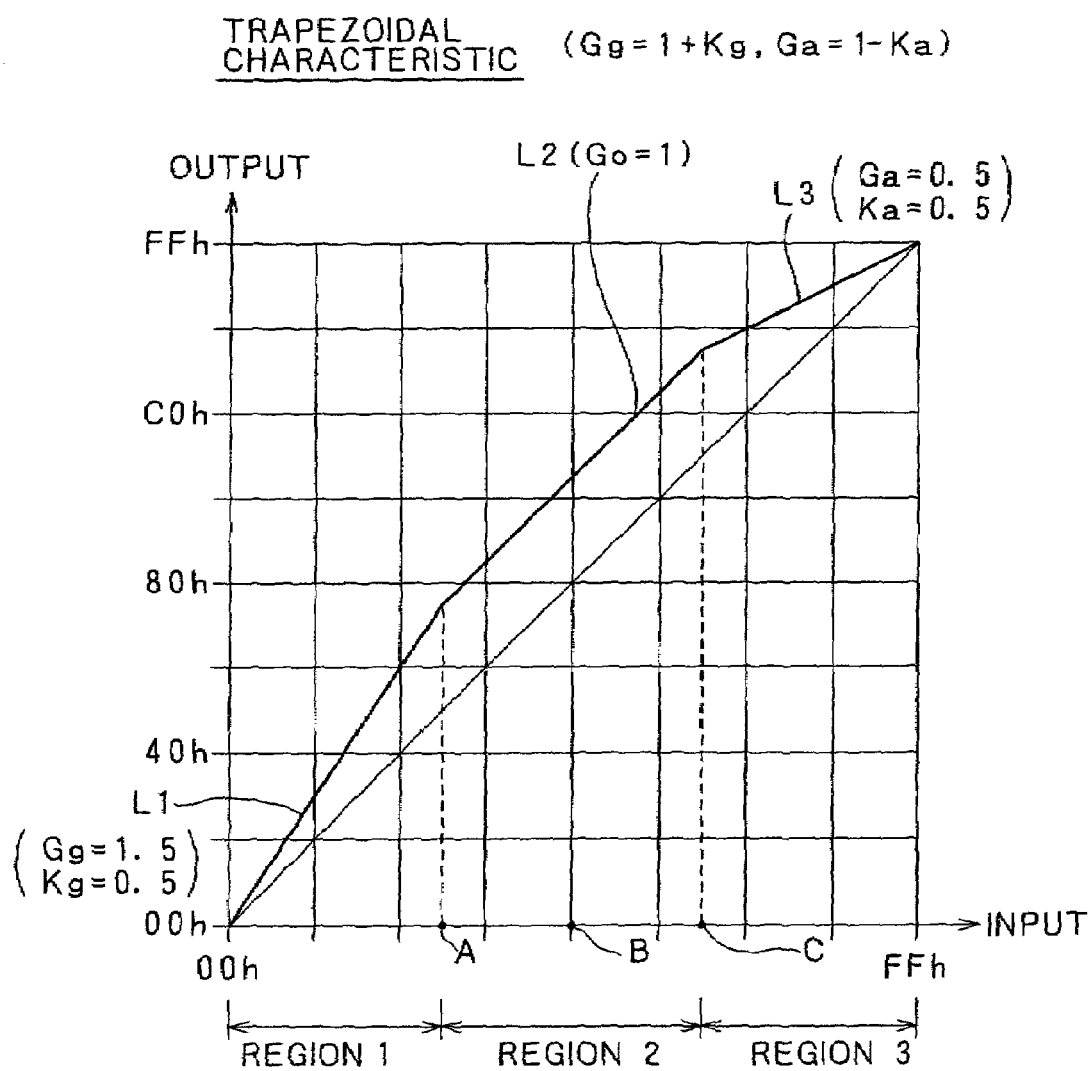
FIG. 20 graphically shows another example of a trapezoidal characteristic.
Figure 21:
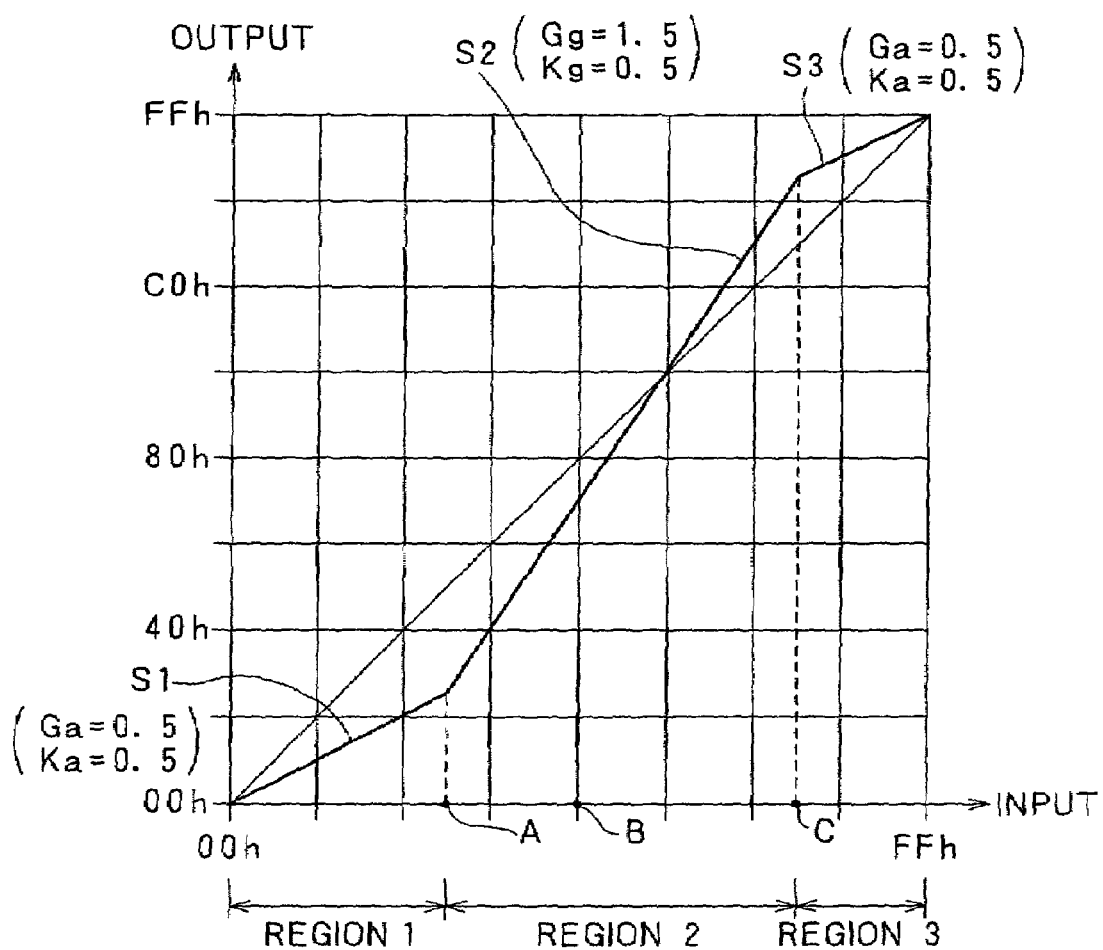
FIG. 21 graphically shows another example of an S-shaped characteristic.

The trapezoidal characteristic of FIG. 1 shows an exemplary case where the sum of the widths of regions 1 and 3 is equal to the width of region 2. However, the characteristic may be so changed that, as shown in FIG. 20, the sum of the widths of regions 1 and 3 becomes different from the width of region 2. In this case also, if the width of region 1 and that of region 3 are mutually equalized as shown, the correction characteristic with Gg+Ga=2 and Kg=Ka is such that the respective full-scale values of the input and output data are equal to each other, hence eliminating any region loss and rendering the linear portions L1, L2, L3 continuous.

In the original signal generator 10 shown in FIG. 3, it is possible to mutually equalize the width of region 1 and that of region 3 and to make the sum thereof different from the width of region 2 by adequately setting the data Dd that indicates the difference between the intermediate value B and the boundary value A (difference between boundary value C and intermediate value B).

The widths of regions 1 and 3 may be changed on condition that none of region loss is existent and the linear portions L1, L2, L3 are continuous. The gain Go of region 2 need not be exactly 1 if it is smaller than the gain Gg (=1+Kg) of region 1 and greater than the gain Ga (=1−Ka) of region 3.

The S-shaped characteristic of FIG. 2 shows an exemplary case where the width of region 1 and that of region 3 are equal to each other. However, the widths of regions 1 and 3 may be mutually different. In this case also, if the sum of the widths of regions 1 and 3 is equalized to the width of region 2 as shown, the correction characteristic with Gg+Ga=2 and Kg=Ka is such that the respective full-scale values of the input and output data are equal to each other, hence eliminating any region loss and rendering the linear portions S1, S2, S3 continuous.

However, in case the S-shaped characteristic regions 1, 2, 3 are thus changed to be different from the trapezoidal characteristic regions 1, 2, 3, the luminance corrector needs to be modified in such a manner that the original signal generator shown in FIG. 3 is provided for each of the characteristics, and also that the signal selective compositor shown in FIG. 6 is partially altered.

Further, the sum of the widths of regions 1 and 3 may be different from the width of region 2 on condition that none of region loss is existent and the linear portions S1, S2, S3 are continuous.

According to the present invention, as described hereinabove, it becomes possible to remove, in correcting the luminance signal to raise the image luminance and to increase the contrast of dark portions, the known disadvantages that any black level portion is turned to be whitish or white blur is caused in a nearly white level portion to consequently bring about unnatural contrast of the intermediate region. Moreover, the simplified processing realizes advantageous effects of raising the image luminance and increasing the contrast of any dark portion without deterioration of the signal.

What is claimed is:
1. A video processing method for displaying an image input as a video signal comprising the steps of:
dividing an input data region representative of a range of digital luminance data into a plurality of regions comprising substantially all of said input data region;
selecting one of a plurality of output data correction characteristics, each of said plurality of output data correction characteristics being non-linear as a whole, but comprising a linear portion coextensive with each of said plurality of regions and having different slopes in at least two of said regions;
wherein at least one of said output data characteristics is a trapezoidal characteristic which is nonlinear and continuous as a whole and consists of a linear portion in said first region where the gain is greater than one, a linear portion in said second region where the gain is equal to one exactly or approximately, and a linear portion in said third region where the gain is smaller than one; and
wherein at least one of said output data characteristics is an S-shaped characteristic which is nonlinear and continuous as a whole and consists of linear portions in said first and third regions where the gain is smaller than one, and a linear portion in said second region where the gain is greater than one; and correcting digital luminance data corresponding to said video signal included in said plurality of regions in accordance with the selected output data correction characteristic;

wherein said plurality of output data correction characteristics are selected based on an identification information inserted in said video signal to identify said image.

2. A video processing method for displaying an image input as a video signal comprising the steps of:

dividing an input data region representative of a range of color difference data into a plurality of regions comprising substantially all of said input data region;

selecting one of a plurality of output data correction characteristics, each of said plurality of output data correction characteristics being non-linear as a whole, but comprising a linear portion coextensive with each of said plurality of regions and having different slopes in at least two of said regions;

wherein one of said plurality of output data correction characteristics is a trapezoidal characteristic which is nonlinear and continuous as a whole and consists of a linear portion in a first region where the gain is greater than one, a linear portion in a second region where the gain is equal to one exactly or approximately, and a linear portion in a third region where the gain is smaller than one, and one of said plurality of output data correction characteristics is an S-shaped characteristic which is nonlinear and continuous as a whole and consists of linear portions in said first and third regions where the gain is smaller than one, and a linear portion in said second region where the gain is greater than one;

correcting the digital luminance data corresponding to said video signal included in said plurality of regions in accordance with the selected output data correction characteristic; and executing gain control or hue control with regard to digital color difference data or other digital color data;

wherein said plurality of output data correction characteristics are selected based on an identification information inserted in said video signal to identify said image.

3. A video processing method for displaying an image input as a video signal comprising the steps of:

dividing an input data region representative of a range of color difference data into a plurality of regions comprising substantially all of said input data region;

selecting one of a plurality of output data correction characteristics, each of said plurality of output data correction characteristics being non-linear as a whole, but comprising a linear portion coextensive with each of said plurality of regions and having different slopes in at least two of said regions;

separating luminance data and color difference data from digital video data which are composed of the luminance data and the color difference data to be multiplexed;

wherein one of said plurality of output data correction characteristics is a trapezoidal characteristic which is nonlinear and continuous as a whole and consists of a linear portion in a first region where the gain is greater than one, a linear portion in a second region where the gain is equal to one exactly or approximately, and a linear portion in a third region where the gain is smaller than one, and one of said plurality of output data correction characteristics is an S-shaped characteristic which is nonlinear and continuous as a whole and consists of linear portions in said first and third regions where the gain is smaller than one, and a linear portion in said second region where the gain is greater than one;

correcting the separated luminance data corresponding to said video signal included in said plurality of regions in accordance with the selected output data correction characteristic; and executing gain control or hue control with regard to the separated color difference data;

wherein said plurality of output data correction characteristics are selected based on an identification information inserted in said video signal to identify said image.

4. The video processing method according to claim 1, wherein selected output data correction characteristic equalizes the sum of the widths of the first and third regions to the width of the second region.

5. A video processing device for displaying an image input as a video signal and for dividing an input data region representative of a range of digital color difference data into a plurality of regions comprising substantially all of said input data region and for selecting one of a plurality of output data correction characteristics, each of said plurality of output data correction characteristics being non-linear as a whole, but comprising a linear portion coextensive with each of said plurality of regions and having different slopes in at least two of said regions, comprising:

a data separator circuit for separating luminance data and color difference data from digital video data which are composed of the luminance data and the color difference data to be multiplexed; and a luminance corrector circuit for correcting the luminance data separated by said data separator circuit, wherein one of said plurality of output data correction characteristics is a trapezoidal characteristic which is nonlinear and continuous as a whole and consists of a linear portion in a first region where the gain is greater than one, a linear portion in a second region where the gain is equal to one exactly or approximately, and a linear portion in a third region where the gain is smaller than one, and one of said plurality of output data correction characteristics is an S-shaped characteristic which is nonlinear and continuous as a whole and consists of linear portions in said first and third regions where the gain is smaller than one, and a linear portion in said second region where the gain is greater than one; and a correcting unit for correcting digital luminance data corresponding to said video signal included in said plurality of regions in accordance with said selected output data correction characteristic;

wherein said plurality of output data correction characteristics are selected based on an identification information inserted in said video signal to identify said image.

6. A video processing device for displaying an image input as a video signal and for dividing an input data region representative of a range of digital color difference data into a plurality of regions comprising substantially all of said input data region and for selecting one of a plurality of output data correction characteristics, each of said plurality of output data correction characteristics being non-linear as a whole, but comprising a linear portion coextensive with each of said plurality of regions and having different slopes in at least two of said regions, comprising:

a data separator circuit for separating luminance data and color difference data from digital video data which are composed of the luminance data and the color difference data to be multiplexed;

a luminance corrector circuit for correcting the luminance data separated by said data separator circuit, wherein one of said plurality of output data correction characteristics is a trapezoidal characteristic which is nonlinear and continuous as a whole and consists of a linear portion in a first region where the gain is greater than one, a linear portion in a second region where the gain is equal to one exactly or approximately, and a linear portion in a third region where the gain is smaller than one, and one of said plurality of output data correction characteristics is an S-shaped characteristic which is nonlinear and continuous as a whole and consists of linear portions in said first and third regions where the gain is smaller than one, and a linear portion in said second region where the gain is greater than one;

a control processing circuit for executing gain control or hue control with regard to the color difference data separated by said data separator circuit; and a correcting unit for correcting digital luminance data corresponding to said video signal included in said plurality of regions in accordance with said selected output data correction characteristic;

wherein said plurality of output data correction characteristics are selected based on an identification information inserted in said video signal to identify said image.

7. The video processing device according to claim 5, further comprising a data compositor circuit for compositing the output luminance data of said luminance corrector circuit and the output color difference data of said data separator circuit or said control processing circuit.

8. A digital video appliance comprising, as a video processor therein, a video processing device for displaying an image input as a video signal and for dividing an input data region representative of a range of digital color difference data into a plurality of regions comprising substantially all of said input data region and for selecting one of a plurality of output data correction characteristics, each of said plurality of output data correction characteristics being non-linear as a whole, but comprising a linear portion coextensive with each of said plurality of regions and having different slopes in at least two of said regions, comprising:

a data separator circuit for separating luminance data and color difference data from digital video data which are composed of the luminance data and the color difference data to be multiplexed;

a luminance corrector circuit for correcting the luminance data separated by said data separator circuit, wherein one of said plurality of output data correction characteristics is a trapezoidal characteristic which is nonlinear and continuous as a whole and consists of a linear portion in a first region where the gain is greater than one, a linear portion in a second region where the gain is equal to one exactly or approximately, and a linear portion in a third region where the gain is smaller than one and, and one of said plurality of output data correction characteristics is an S-shaped characteristic which is nonlinear and continuous as a whole and consists of linear portions in said first and third regions where the gain is smaller than one, and a linear portion in said second region where the gain is greater than one; and a correcting unit for correcting digital luminance data corresponding to said video signal included in said plurality of regions in accordance with said selected output data correction characteristic;

wherein said plurality of output data correction characteristics are selected based on an identification information inserted in said video signal to identify said image.

9. A digital video appliance comprising, as a video processor therein, a video processing device for displaying an image input as a video signal and for dividing an input data region representative of a range of digital color difference data into a plurality of regions comprising substantially all of said input data region and for selecting one of a plurality of output data correction characteristics, each of said plurality of output data correction characteristics being non-linear as a whole, but comprising a linear portion coextensive with each of said plurality of regions and having different slopes in at least two of said regions, comprising:

a data separator circuit for separating luminance data and color difference data from digital video data which are composed of the luminance data and the color difference data to be multiplexed;

a luminance corrector circuit for correcting the luminance data separated by said data separator circuit, wherein one of said plurality of output data correction characteristics is a trapezoidal characteristic which is nonlinear and continuous as a whole and consists of a linear portion in a first region where the gain is greater than one, a linear portion in a second region where the gain is equal to one exactly or approximately, and a linear portion in a third region where the gain is smaller than one, and one of said plurality of output data correction characteristics is an S-shaped characteristic which is nonlinear and continuous as a whole and consists of linear portions in said first and third regions where the gain is smaller than one, and a linear portion in said second region where the gain is greater than one;

a control processing circuit for executing gain control or hue control with regard to the color difference data separated by said data separator circuit; and a correcting unit for correcting digital luminance data corresponding to said video signal included in said plurality of regions in accordance with said selected output data correction characteristic;

wherein said plurality of output data correction characteristics are selected based on an identification information inserted in said video signal to identify said image.

10. A digital video appliance comprising, as a video processor therein, a video processing device for displaying an image input as a video signal and for dividing an input data region representative of a range of digital luminance data into a plurality of regions comprising substantially all of said input data region and for selecting one of a plurality of output data correction characteristics, each of said plurality of output data correction characteristics being non-linear as a whole, but comprising a linear portion coextensive with each of said plurality of regions and having different slopes in at least two of said regions; said video processing device comprising:

a component generator for generating components including post-correction output luminance data in first, second and third regions from pre-correction input luminance data and data which determine a boundary value between the first and second regions and a boundary value between the second and third regions;

a selective compositor for selecting the components generated by said component generator in response to signals for identifying the first, second and third regions, and producing post-correction output luminance data over the input data region of the input luminance data;

a correcting unit for correcting digital luminance data corresponding to said video signal included in said plurality of regions in accordance with said selected output data correction characteristic;

wherein said plurality of output data correction characteristics are selected based on an identification information inserted in said video signal to identify said image;

a memory capable of holding the stored content without any power supply or with a backup power supply; and a controller for writing a control state relative to video data as a control parameter in said memory correspondingly to video identification information which specifies the video, or to characteristic descriptive information which describes the image characteristic, wherein, when the video data are to be outputted, said controller reads out the control parameter from said memory if the video identification information or the characteristic descriptive information relative to the output video data is stored in said memory and also if the control parameter corresponding to such information is stored therein, and said controller sets the control state for the output video data in accordance with the control parameter thus read out.

11. A digital video appliance comprising, as a video processor therein, a video processing device for displaying an image input as a video signal and for dividing an input data region representative of a range of digital color difference data into a plurality of regions comprising substantially all of said input data region and for selecting one of a plurality of output data correction characteristics, each of said plurality of output data correction characteristics being non-linear as a whole, but comprising a linear portion coextensive with each of said plurality of regions and having different slopes in at least two of said regions, comprising:

a data separator circuit for separating luminance data and color difference data from digital video data which are composed of the luminance data and the color difference data to be multiplexed:

a luminance corrector circuit for correcting the luminance data separated by said data separator circuit:

a correcting unit for correcting digital luminance data corresponding to said video signal included in said plurality of regions in accordance with said selected output data correction characteristic:

wherein said plurality of output data correction characteristics are selected based on an identification information inserted in said video signal to identify said image;

a memory capable of holding the stored content without any power supply or with a backup power supply; and a controller for writing a control state relative to video data as a control parameter in said memory correspondingly to video identification information which specifies the video, or to characteristic descriptive information which describes the image characteristic, wherein, when the video data are to be outputted, said controller reads out the control parameter from said memory if the video identification information or the characteristic descriptive information relative to the output video data is stored in said memory and also if the control parameter corresponding to such information is stored therein, and said controller sets the control state for the output video data in accordance with the control parameter thus read out.

12. The digital video appliance according to claim 8, further comprising:

a memory capable of holding the stored content without any power supply or with a backup power supply; and a controller for writing a control state relative to video data as a control parameter in said memory correspondingly to video identification information which specifies the video, or to characteristic descriptive information which describes the image characteristic, wherein, when the video data are to be outputted, said controller reads out the control parameter from said memory if the video identification information or the characteristic descriptive information relative to the output video data is stored in said memory and also if the control parameter corresponding to such information is stored therein, and said controller sets the control state for the output video data in accordance with the control parameter thus read out.

13. A digital video appliance comprising, as a video processor therein, a video processing device for displaying an image input as a video signal and for dividing an input data region representative of a range of digital color difference data into a plurality of regions comprising substantially all of said input data region and for selecting one of a plurality of output data correction characteristics, each of said plurality of output data correction characteristics being non-linear as a whole, but comprising a linear portion coextensive with each of said plurality of regions and having different slopes in at least two of said regions, comprising:

a data separator circuit for separating luminance data and color difference data from digital video data which are composed of the luminance data and the color difference data to be multiplexed;

a luminance corrector circuit for correcting the luminance data separated by said data separator circuit;

a control processing circuit for executing gain control or hue control with regard to the color difference data separated by said data separator circuit;

a correcting unit for correcting digital luminance data corresponding to said video signal included in said plurality of regions in accordance with said selected output data correction characteristic;

where in said plurality of output data correction characteristics are selected based on an identification information inserted in said video signal to identify said image;

a memory capable of holding the stored content without any power supply or with a backup power supply; and a controller for writing a control state relative to video data as a control parameter in said memory correspondingly to video identification information which specifies the video, or to characteristic descriptive information which describes the image characteristic, wherein, when the video data are to be outputted, said controller reads out the control parameter from said memory if the video identification information or the characteristic descriptive information relative to the output video data is stored in said memory and also if the control parameter corresponding to such information is stored therein, and said controller sets the control state for the output video data in accordance with the control parameter thus read out.

14. The digital video appliance according to claim 9, further comprising:

a memory capable of holding the stored content without any power supply or with a backup power supply; and a controller for writing a control state relative to video data as a control parameter in said memory correspondingly to video identification information which specifies the video, or to characteristic descriptive information which describes the image characteristic, wherein, when the video data are to be outputted, said controller reads out the control parameter from said memory if the video identification information or the characteristic descriptive information relative to the output video data is stored in said memory and also if the control parameter corresponding to such information is stored therein, and said controller sets the control state for the output video data in accordance with the control parameter thus read out.

* * * * *